(12) United States Patent
Rodney

(10) Patent No.: US 9,938,821 B2
(45) Date of Patent: Apr. 10, 2018

(54) SYSTEMS AND METHODS FOR CASING DETECTION USING RESONANT STRUCTURES

(71) Applicant: HALLIBURTON ENERGY SERVICES, INC., Houston, TX (US)

(72) Inventor: Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/907,200

(22) PCT Filed: Aug. 29, 2013

(86) PCT No.: PCT/US2013/057410
§ 371 (c)(1),
(2) Date: Jan. 22, 2016

(87) PCT Pub. No.: WO2015/030781
PCT Pub. Date: Mar. 5, 2015

(65) Prior Publication Data
US 2016/0160633 A1 Jun. 9, 2016

(51) Int. Cl.
*G01V 3/00* (2006.01)
*E21B 47/09* (2012.01)
(Continued)

(52) U.S. Cl.
CPC .... *E21B 47/0905* (2013.01); *E21B 47/02216* (2013.01); *G01V 3/28* (2013.01)

(58) Field of Classification Search
None
See application file for complete search history.

(56) References Cited

U.S. PATENT DOCUMENTS 3,889,262 A 6/1975 Zimmermann et al.
4,016,942 A 4/1977 Wallis, Jr. et al.
(Continued)

FOREIGN PATENT DOCUMENTS

CN 2901341 5/2007
CN 101806211 8/2010
(Continued)

OTHER PUBLICATIONS

PCT ISR-WO dated May 12, 2014, issued by Korean Intellectual Property Office, 26 pgs.
(Continued)

*Primary Examiner* — Adolf Dsouza
(74) *Attorney, Agent, or Firm* — Alan Bryson; Parker Justiss, P.C.

(57) ABSTRACT

A well casing detection system includes a well casing and a ranging tool. The well casing includes a beacon with a resonant structure and a power supply. The ranging tool includes a magnetic field inducer, a magnetic field detector, and a power supply. This detection system is used to remotely detect well casing while it is deployed in a well, and may be used in conjunction with measurement while drilling (MWD) methods, logging while drilling (LWD) methods, coiled tubing drilling methods, steam assisted gravity drainage (SAGD), and wireline drilling methods, such that an operator may simultaneously direct the operation of a drill while operating the detection system.

30 Claims, 20 Drawing Sheets

100

(51) Int. Cl.
*E21B 47/022* (2012.01)
*G01V 3/28* (2006.01)

(56) References Cited

U.S. PATENT DOCUMENTS

| | | | |
|---|---|---|---|
| 4,023,167 A | 5/1977 | Wahlstrom | |
| 4,443,762 A | 4/1984 | Kuckes | |
| 4,512,402 A | 4/1985 | Kompanek et al. | |
| 4,572,293 A | 2/1986 | Wilson et al. | |
| 4,593,770 A | 6/1986 | Hoehn, Jr. | |
| 4,753,587 A | 6/1988 | Djordjevic et al. | |
| 4,791,373 A | 12/1988 | Kuckes | |
| 4,811,030 A | 3/1989 | Pedersen | |
| 4,821,035 A | 4/1989 | Hanson et al. | |
| 4,836,299 A | 6/1989 | Bodine | |
| 4,933,640 A | 6/1990 | Kuckes | |
| 5,293,936 A | 3/1994 | Bridges | |
| 5,305,212 A | 4/1994 | Kuckes | |
| 5,343,152 A | 8/1994 | Kuckes | |
| 5,418,335 A | 5/1995 | Winbow | |
| 5,485,089 A | 1/1996 | Kuckes | |
| 5,589,775 A | 12/1996 | Kuckes | |
| 5,676,212 A | 10/1997 | Kuckes | |
| 5,923,170 A | 7/1999 | Kuckes | |
| 5,960,370 A | 9/1999 | Towle et al. | |
| RE36,569 E | 2/2000 | Kuckes | |
| 6,026,913 A | 2/2000 | Mandal et al. | |
| 6,534,986 B2 | 5/2003 | Nichols | |
| 6,710,600 B1 | 3/2004 | Kopecki et al. | |
| 6,759,968 B2 | 7/2004 | Zierolf | |
| 6,795,373 B1 | 9/2004 | Aronstam | |
| 6,891,481 B2 | 5/2005 | Dubinsky et al. | |
| 6,984,980 B2 | 1/2006 | Kruspe et al. | |
| 7,170,424 B2 | 1/2007 | Vinegar et al. | |
| 7,400,263 B2 | 7/2008 | Snider et al. | |
| 7,453,768 B2 | 11/2008 | Hall et al. | |
| 7,568,532 B2 | 8/2009 | Kuckes et al. | |
| 7,590,029 B2 | 9/2009 | Tingley | |
| 7,703,548 B2 | 4/2010 | Clark | |
| 7,812,610 B2 | 10/2010 | Clark et al. | |
| 7,823,689 B2 | 11/2010 | Aronstam et al. | |
| 8,009,059 B2 | 8/2011 | Huang et al. | |
| 8,011,451 B2 | 9/2011 | MacDonald | |
| 8,077,053 B2 | 12/2011 | Thompson et al. | |
| 8,418,782 B2 | 4/2013 | Waters et al. | |
| 8,917,094 B2 | 12/2014 | Bittar et al. | |
| 2007/0131417 A1 | 6/2007 | Bolshakov et al. | |
| 2007/0235184 A1 | 10/2007 | Thompson et al. | |
| 2009/0178850 A1* | 7/2009 | Waters | E21B 7/04 175/45 |
| 2010/0155138 A1 | 6/2010 | Kuckes | |
| 2010/0155139 A1 | 6/2010 | Kuckes | |
| 2011/0011580 A1 | 1/2011 | Clark et al. | |
| 2012/0067644 A1 | 3/2012 | Goswami et al. | |
| 2012/0109527 A1 | 5/2012 | Bespalov | |
| 2013/0057364 A1* | 3/2013 | Kesler | B60L 11/182 333/219.2 |
| 2014/0232185 A1* | 8/2014 | Sempel | H02J 5/005 307/11 |

FOREIGN PATENT DOCUMENTS

| | | |
|---|---|---|
| GB | 1126019 | 9/1968 |
| GB | 1467124 | 3/1977 |
| JP | 3028787 A | 2/1991 |
| JP | 07311275 | 11/1995 |

OTHER PUBLICATIONS

International Preliminary Report on Patentability and Written Opinion issued by the International Searching Authority in International Application No. PCT/US2013/057410, dated Mar. 1, 2016.

* cited by examiner

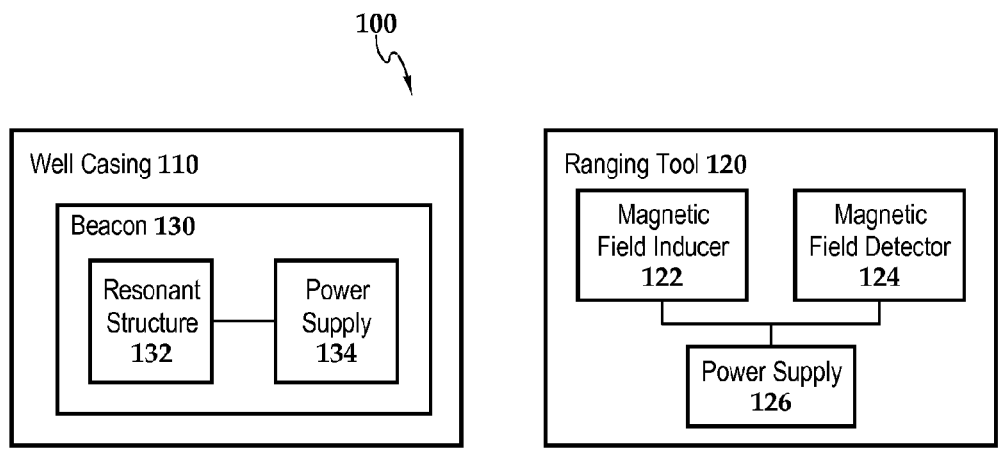
Fig.1
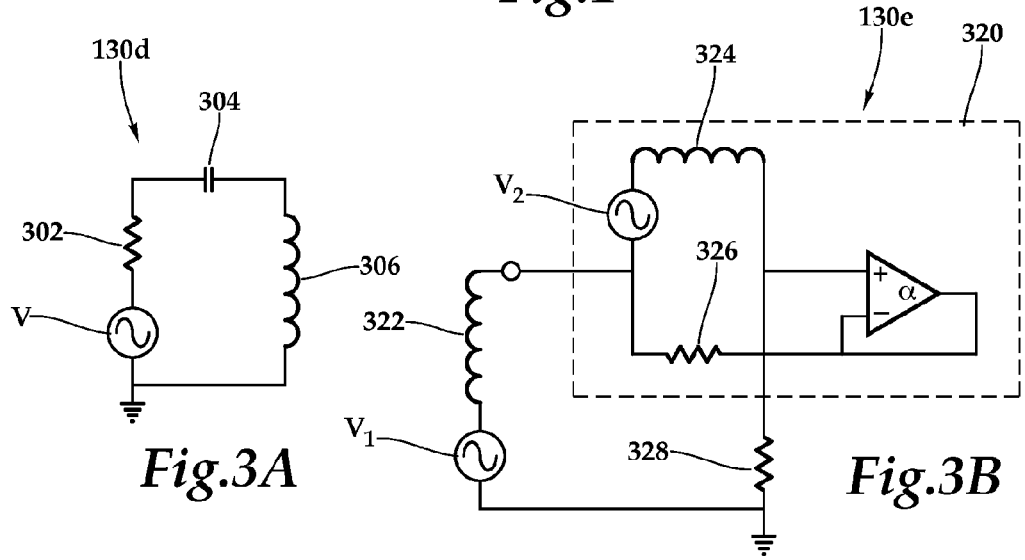
Fig.3A
Fig.3B
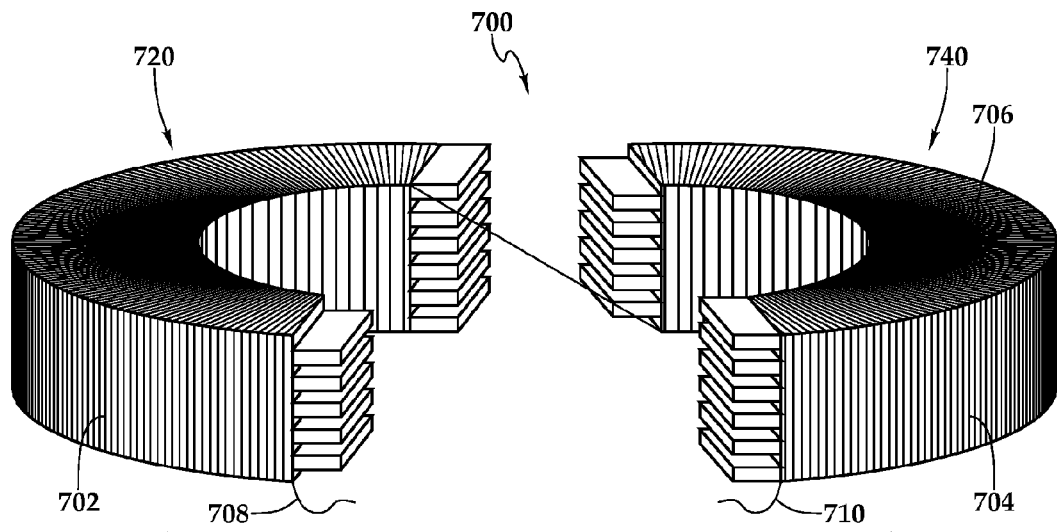
Fig.7

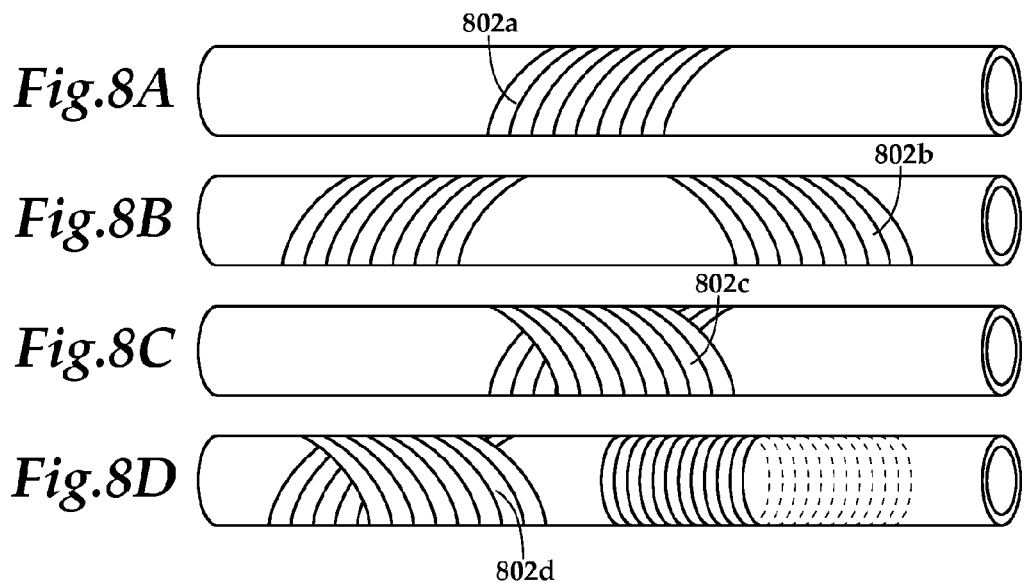
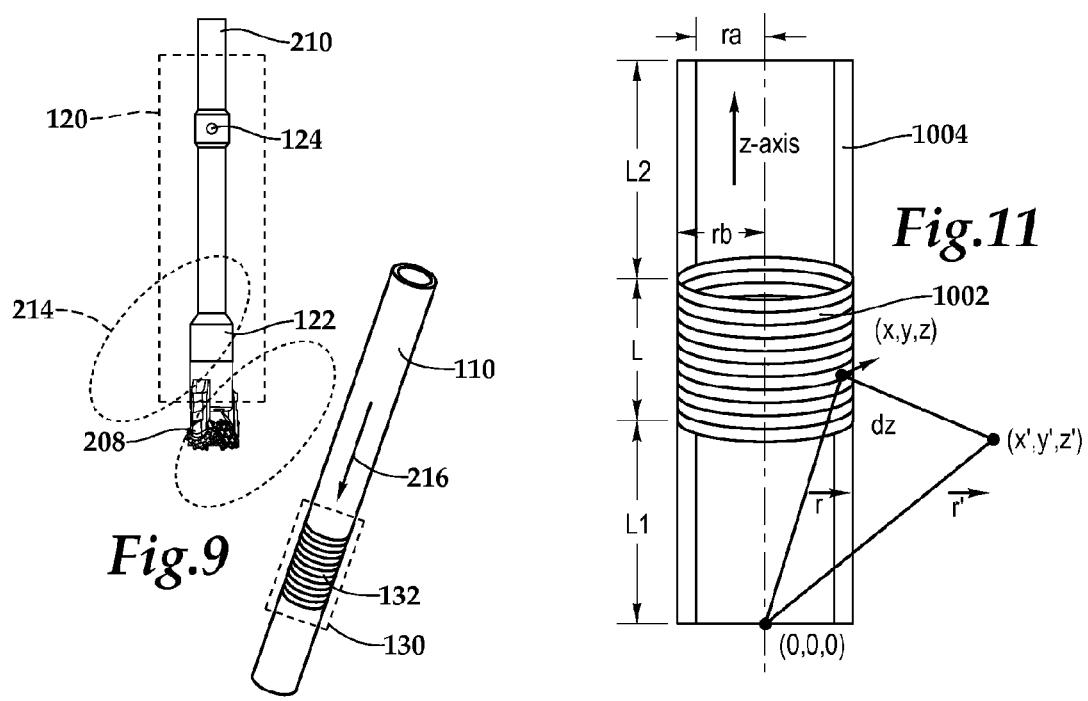
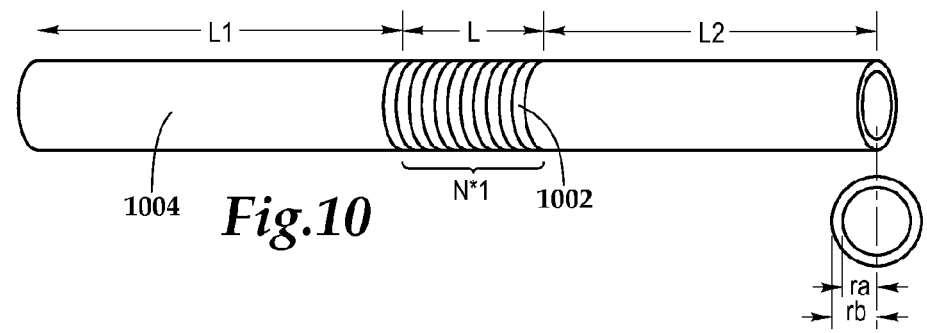

SYSTEMS AND METHODS FOR CASING DETECTION USING RESONANT STRUCTURES

TECHNICAL FIELD

This disclosure relates to well construction, and more particularly to methods and systems for locating well casings of one well while drilling another.

BACKGROUND

Wells are commonly used to access regions below the earth's surface and to acquire materials from these regions, for instance during the location and extraction of petroleum oil hydrocarbons from an underground location. The construction of wells typically includes drilling a borehole and constructing a pipe structure within the borehole. Upon completion, the pipe structure provides access to the underground locations and allows for the transport of materials to the surface.

During construction of a well, a borehole is often drilled in proximity to one or more existing wells. In some instances, it may be necessary to direct drilling away from existing well structures, such that the drill or the existing well structures are not damaged by a collision. Alternatively or additionally, it may be necessary to direct a drill alongside an existing well structure, such that the drill maintains a pre-determined distance from an existing structure. In some cases, it may be necessary to direct a drill towards an existing well structure, for instance during the construction to a relief well.

Moreover, in some instances it may be necessary to distinguish one existing well structure from another existing well structure. For instance, an operator may wish to drill alongside a specific well structure or drill towards a specific well structure, while maintaining sufficient distance between other specific well structures.

Thus, it is desirable to determine the location of existing wells and to distinguish existing wells from one another, to properly direct a drill during well construction.

DESCRIPTION OF DRAWINGS

FIG. 1 is a block diagram of a well casing detection system.

FIGS. 3A-B show example resonant structures.

FIG. 7 shows various embodiments of inductors used in resonant structures.

FIGS. 8A-D show various examples of winding patterns for solenoids or toroidal inductors.

FIG. 9 shows the operation of an embodiment of a ranging tool.

FIG. 10 shows an embodiment of a resonant structure with a solenoid on a section of casing.

FIG. 11 shows an embodiment of a resonant structure and a point of observation.

Like reference symbols in the various drawings indicate like elements.

DETAILED DESCRIPTION

Figure 2A:
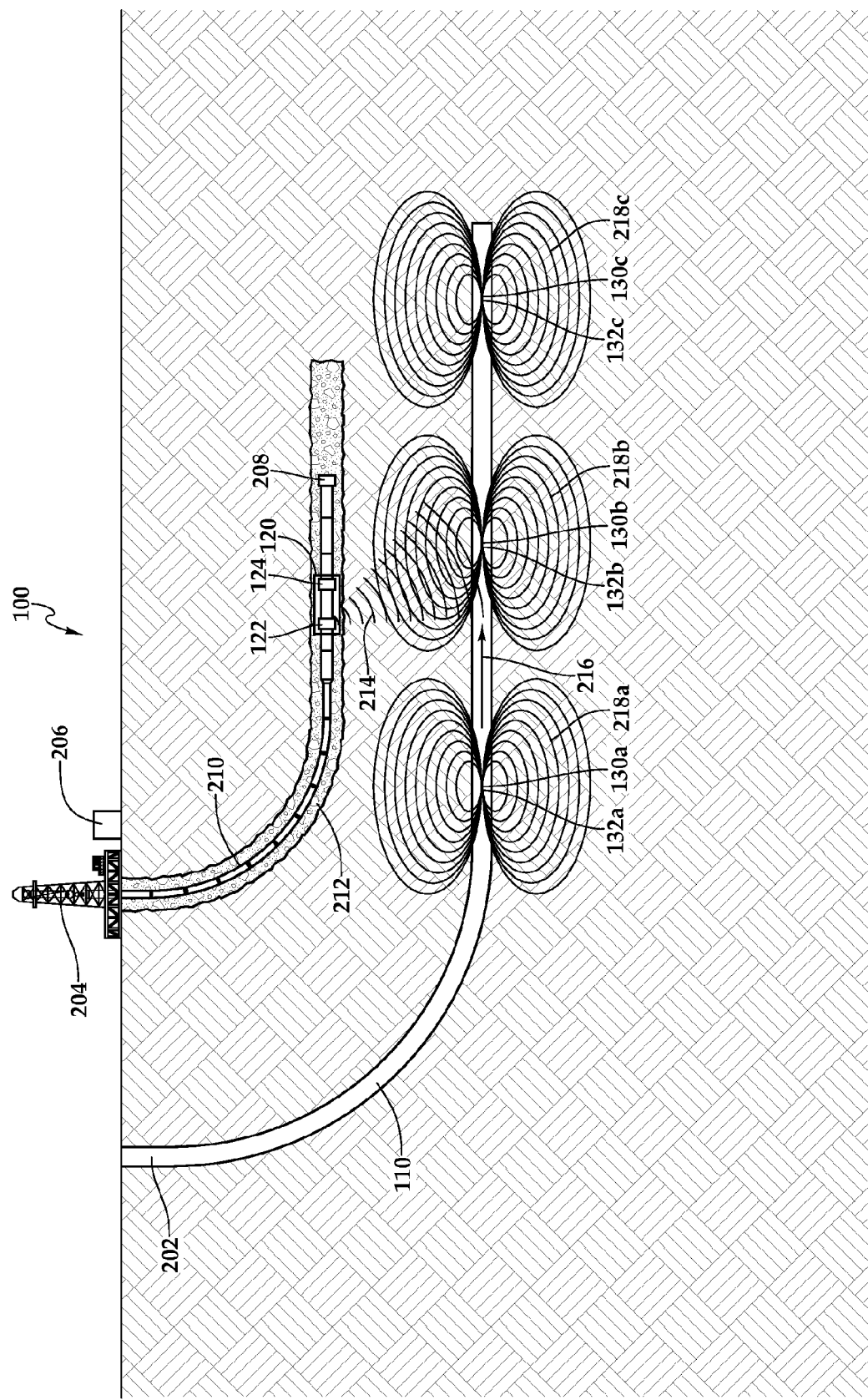
FIGS. 2A-C show embodiments of a well casing detection system being used in a field with multiple wells.

Referring to an embodiment shown in the block diagram of FIG. 1, a well casing detection system 100 includes a well casing 110 and a ranging tool 120. Well casing 110 includes a beacon 130 with a resonant structure 132. In some embodiments, beacon 130 is an active structure and further includes a power supply 134. Ranging tool 120 includes a magnetic field inducer 122, a magnetic field detector 124, and a power supply 126. Detection system 100 is used to remotely detect well casing 110 while it is deployed in a well. Detection system 100 may be used in conjunction with measurement while drilling (MWD) methods, logging while drilling (LWD) methods, coiled tubing drilling methods, steam assisted gravity drainage (SAGD), and wireline drilling methods, such that an operator may simultaneously direct the operation of a drill while operating detection system 100.

Well casing 110 provides access to underground locations, provides a means of transporting materials to the surface, and varies in specification depending on its application and intended usage. For example, an embodiment of well casing 110 used for the extraction of hydrocarbons from an underground location extends approximately 1,500-20,000 feet below the surface with a measured depth (or length along the well path) that may extend to 35,000 feet or beyond. In some embodiments, well casing 110 is tubular with a diameter that changes as a well progresses, and may have a diameter of approximately 4.5-26 inches, or larger. Well casing 110 may be made of various materials. For example, well casing 110 can be constructed of steel or another other metal or metal alloy. In some embodiments, well casing 110 is electrically conductive, such that a current may be induced across its length.

FIG. 2 shows an embodiment wherein a detection system 100 is deployed in a field that includes an established well 202 and a second well 204 that is under construction. Well 202 includes well casing 110 and multiple beacons 130a, 130b, and 130c installed along the length of well casing 110. Each beacon 130a-c contains at least one resonant structure having at least one corresponding resonant frequency. Ranging tool 120 is attached to a drill string 210, which connects a drill unit 208 to a surface control unit 206. Using surface control unit 206, an operator on the surface operates drill unit 208 to create a channel 212 for future pipe installations, and also operates ranging tool 120 to detect well casing 110.

According to various embodiments involving measurement while drilling (MWD) methods, logging while drilling (LWD) methods, coiled tubing drilling methods, steam assisted gravity drainage (SAGD), and wireline drilling methods, in the embodiment shown in FIG. 2 the operator uses surface control unit 206 to direct the drill unit 208 along a three dimensional path. Surface control unit 206 contains a processor, various data stores, and a telemetry system to receive, process, and transmit information concerning the operation of drill unit 208 and ranging tool 120.

During a well construction process, in one embodiment according to FIG. 2 it is desired that drill unit 208 remain sufficiently remote from the existing well casing 110 to avoid damaging either well casing 110 or drill unit 208 or both. This distance varies depending on the application. For example, in the construction of some oil wells, a distance of approximately 5 to 15 feet is desirable to minimize damage. To ensure proper separation, the operator uses ranging tool 120 to determine one or more location parameters regarding the drill unit 208 relative to the well casing 110. The location parameters may include, for example, the distance between the drill unit 208 and well casing 110 and/or the direction of the well casing 110 relative to the drill unit 208. During operation of ranging tool 120, magnetic field inducer 122 induces a time varying magnetic inducing field 214 with frequency $\omega_i$ in the proximity of well casing 110. As well casing 110 is electrically conductive, magnetic inducing field 214 induces a time varying current 216 with frequency $\omega_i$ upon the length of well casing 110. When $\omega_i$ is sufficiently close to the resonant frequency of resonant structure 132a $\omega_0$, resonant structure 132a of beacon 130a resonates, producing a second time varying magnetic response field 218a at frequency $\omega_0$.

In some embodiments, the resonant structure 132a in beacon 130a resonates when in the proximity of magnetic inducing field 214, independent of the presence of current 216 in well casing 110. In some embodiments, the resonant structure 132a in beacon 130a resonates if either it is in proximity of magnetic inducing field 214 or if a current 216 is induced along the length of well casing 110.

Magnetic field detector 124 measures magnetic response field 218a. In various embodiments, one of several types of magnetic field detectors may be used, for example fluxgate magnetometers or solenoids.

Based upon measurements obtained by magnetic field detector 124, ranging tool 120 determines the distance between magnetic field detector 124 and resonant structure 132 and the direction of resonant structure 132 relative to the magnetic field detector 124. Distance and/or direction information is transmitted along drill string 210 to control unit 206 for operator feedback. In some embodiments, distance and/or direction can be determined by a device external to the ranging tool, such as surface control unit 206 or another device. In some embodiments, ranging tool 120 provides measurement data to the external device through a wired connection, for instance a connector element in drill string 210, or through a wireless connection. Likewise, the device transmits distance and/or direction information to control unit 206 through a similar wireless or wired connection. Distance and direction determination is discussed in greater detail below.

Distance information obtained by detection system 100 is a close approximation of the distance between the drill unit 208 and the well casing 110. For example, in some embodiments magnetic field detector 124 is mounted near drill unit 208, and resonant structure 132 is mounted close to the surface of well casing 110. In some embodiments, magnetic field detector 124 is placed between 10 and 100 feet from drill unit 208, and resonant structure 132 is placed in direct contact with the surface of well casing 110. The operator uses distance information obtained by detection system 100 to direct drill unit 208 away from well casing 110, avoiding potential damage from a collision.

In some embodiments, multiple other resonant structures 132 also resonate with resonant structure 132a of beacon 130a. For example, in some embodiments resonant structures 132b and 132c of beacons 130b and 130c, respectively, likewise have a resonant frequency of $\omega_0$, and resonant structures 132b and 132c of beacons 130b and 130c, respectively, also resonate with resonant structure 132a of beacon 130a to induce time varying magnetic response fields 218b and 218c, respectively. Magnetic field detector 124 also measures these magnetic fields, and ranging tool 120 determines the distance and direction between the detector and each of the beacons, and transmits the distance and direction information to control unit 206 for operator feedback.

In some embodiments, several similar beacons 130 are placed along a length of well casing 110 such that the operator uses ranging tool 120 to determine the locations of several beacons at once. The operator may use this information to judge the location of well casing 110, and guide drill unit 208 away from the entirety of the length of well casing 110.

In some implementations, it may instead be desirable to guide drill unit 208 towards well casing 110, for example during the construction of a relief well. In these scenarios, the operator instead uses ranging tool 120 to determine one or more location parameters regarding the drill unit 208 relative to the well casing 110, and guides drill unit 208 towards well casing 110 based upon the location parameters.

The location parameters may include, for example, the distance between the drill unit 208 and well casing 110 and/or the direction of the well casing 110 relative to the drill unit 208.

In various embodiments, resonant structures 132 of beacons 130 need not have the same resonant frequency. For example, in some embodiments one or more resonant structures 132 of beacons 130 have a different resonant frequency $\omega_0'$, such that the resonant structure 132 of beacon 130 does not resonate in response to a time varying current 216 of frequency $\omega_i$. In some embodiments, ranging tool 120 instead induces a magnetic field with a frequency of $\omega_i'$ sufficiently close to $\omega_0'$, such that resonant structures 132 of beacons 130 resonate and produce a varying magnetic response field 218 of frequency $\omega_i'$. In this manner, only the resonant structures 132 of beacons 130 with a resonant frequency sufficiently close to $\omega_0'$ will induce a corresponding magnetic response field 218. In some embodiments, ranging tool 120 toggles between several frequencies $\omega_i, \omega_i', \ldots \omega_0^{(n)}$ in order to induce and detect magnetic fields of various frequencies. In some embodiments, ranging tool 120 also sweeps across one or more frequency ranges, such that it induces and detects magnetic fields over a continuous range of frequencies. In this manner, an operator can differentiate between different beacons with different resonant frequencies, and can selectively induce magnetic response fields 218 in only a subset of the beacons.

In some embodiments, numerous beacons 130, each with resonant structures 132 of a different resonant frequency, are placed onto different portions of the well casing 110 of a single well. An operator uses ranging tool 120 to select the frequency of the magnetic inducing field 214 in order to selectively induce magnetic response field 218 from a specific beacon, and to determine the distance and direction between the drill unit 208 and a specific portion of the well casing 110. In some embodiments, beacons 130 are placed at known depths, and the operator uses ranging tool 120 to determine the depth of the drilling unit 208.

Figure 2B:
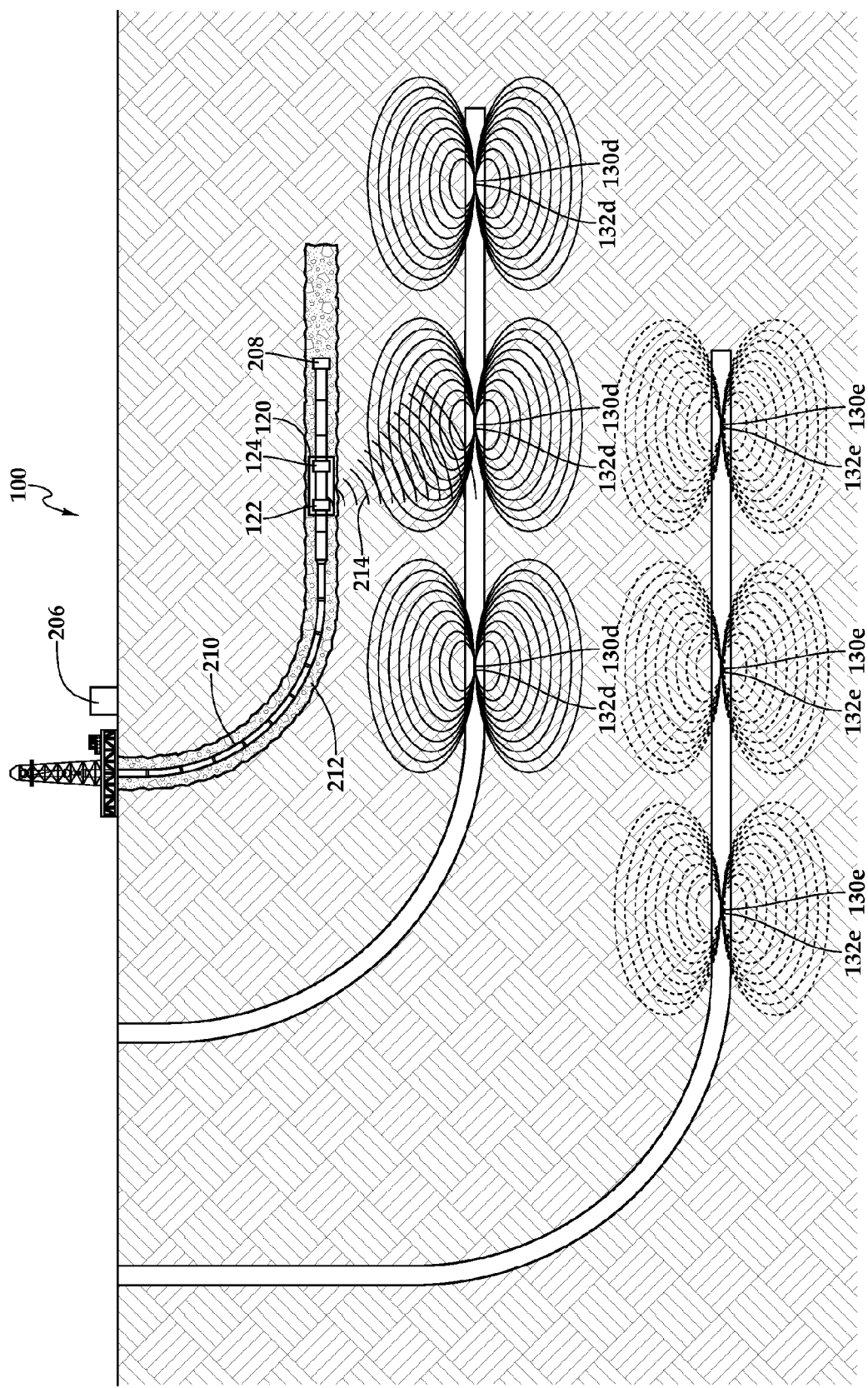

Referring to FIG. 2B, in some embodiments, a first group of beacons 130d, each with a resonant structure 132d of a first resonant frequency, are placed along the well casing of a first well. A second group of beacons 130e, each with a resonant structure 132e of a second resonant frequency, are placed along the well casing of a second well. The operator can toggle ranging tool 120 to select between the first and second resonant frequencies in order to distinguish the well casing of the first well from the well casing of the second well. This is particularly advantageous in scenarios where a specific well among a field of numerous wells is targeted, such as during the construction of a relief well to relieve a specific faulty well.

Figure 2C:
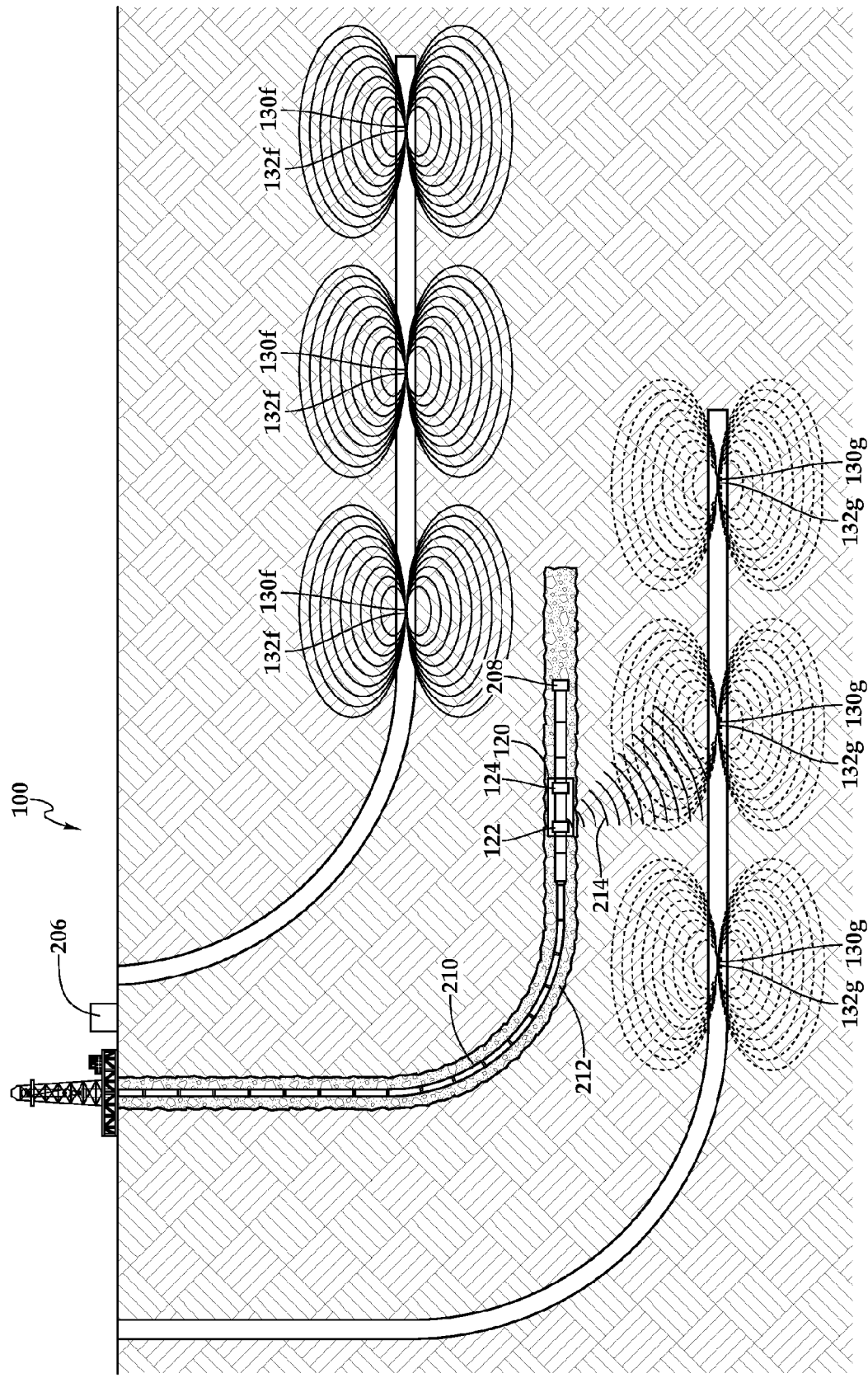

Referring to FIG. 2C, in some embodiments, a first group of beacons 130f, each with a resonant structure 132f of a first resonant frequency, are placed along the well casing of a first well. A second group of beacons 130g, each with a resonant structure 132g of a second resonant frequency, are placed along the well casing of a second well. The operator can toggle ranging tool 120 to select between the first and second resonant frequencies in order to distinguish the well casing of the first well from the well casing of the second well, and to guide drill string 210, tool 120, and drill unit 208 between the two wells. This is advantageous in scenarios where a well is being drilled in a field with numerous existing wells, and allows an operator to accurately guide a drill unit between the existing wells.

In some embodiments, beacons 130 may be placed onto the well casings of two or more wells, and each beacon 130 may have a resonant structure 132 that has either a similar resonant frequency as that of one or more other beacons 130, or a different resonant frequency than that of one or more other beacons 130. An operator may use ranging tool 120 to distinguish between any individual beacon 130 or grouping of beacons 130 in order to identify and differentiate between well casings of any number of well structures.

In some embodiments, ranging tool 120 sweeps across one or more frequency ranges continuously, such that it induces and detects magnetic fields of a continuous range of frequencies.

In some embodiments, the frequency of magnetic inducing field 214 may be tuned depending on the behavior of each resonant structure 132. For instance, in some embodiments, the frequency of magnetic inducing field 214 may adjusted such that it induces the highest response (Q) out of each resonant structure 132. This may be done, for instance, by sweeping magnetic inducing field 214 across a range of frequencies, then selecting the frequency with the highest return response. The select frequency can be stored for later use, for instance in a memory component of ranging tool 120 or surface control unit 206. Likewise, if the resonant structure 132 has its own receiver and power source, it can tune its resonant frequent to match the frequency of magnetic inducing field 214 (or one of its harmonic frequencies) to improve the response of the resonant structure to the magnetic inducing field.

In general, FIG. 3 shows schematics of exemplary resonant structures 132. As illustrated in FIG. 3A, a passive resonant structure 132a includes a resistor 302, capacitor 304, and inductor 306 in series, where v is the voltage induced in the inductor by the ranging tool 120. The inductor is wound around the well casing 110 in such a manner as to induce voltage v. In such a system, $$I = \frac{vR\left(1 - i\frac{\omega}{\omega_0}Q\left(1 - \left(\frac{\omega_0}{\omega}\right)^2\right)\right)}{1 + \left(\frac{\omega}{\omega_0}\right)^2 Q^2\left(1 - \left(\frac{\omega_0}{\omega}\right)^2\right)^2},$$

where R is the resistance of resistor 302, I represents current, and ω is the frequency of induced voltage, and where the resonant frequency $\omega_0$ is expressed as:

$$\omega_0 = \frac{1}{\sqrt{LC}},$$

where L is the inductance of inductor 306 and C is the capacitance of capacitor 304, and where the quality factor Q is expressed as:

$$Q = \frac{\omega_0 L}{R}.$$

Figure 4:
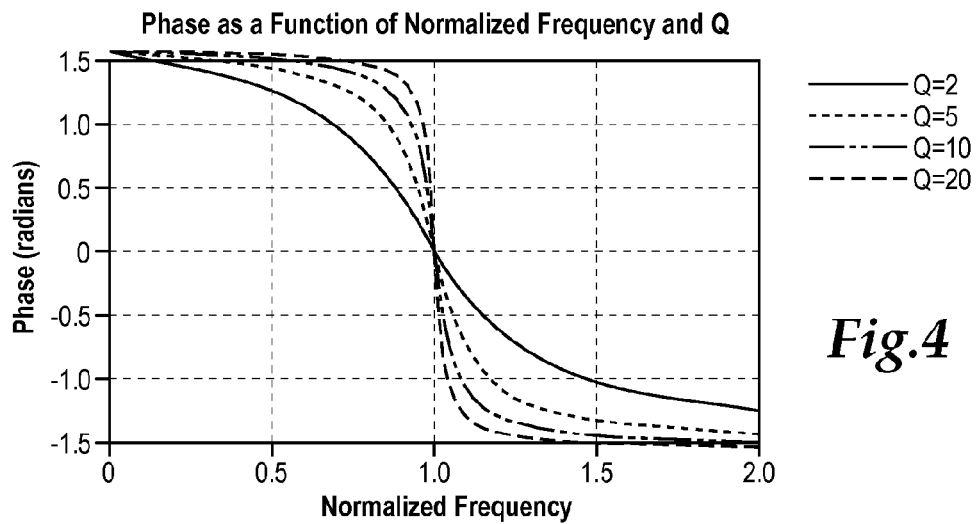
FIG. 4 is a plot of the phase of a current of a resonant structure as a function of normalized frequency and its quality factor.
Figure 5:
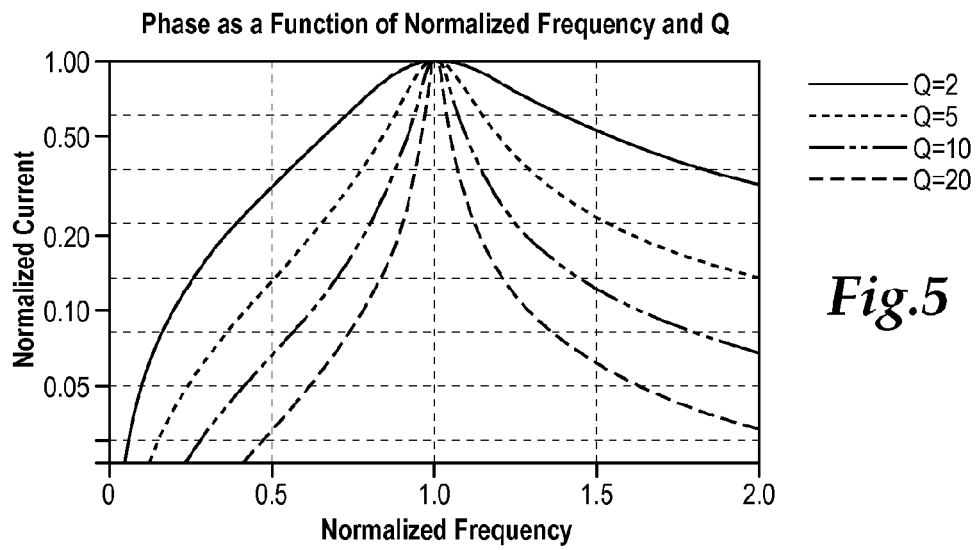
FIG. 5 is a plot of a normalized current of a resonant structure as a function of normalized frequency and its quality factor.

Thus, the phase and magnitude of I, the induced current, can be described using a product of the voltage times the resistance and a function of the normalized frequency (the ratio of the frequency to the resonant frequency) and Q. The phase of current I as a function of normalized frequency and Q is illustrated in FIG. 4. The normalized current I as a function of normalized frequency and Q is illustrated in FIG. 5.

When below the resonant frequency, the resonant system will generally emit a signal that is about 90 degrees in phase ahead that of the signal that is normally reflected by the casing, while when above the resonant frequency, the signal given off by the resonant system will have a phase that is behind that of the normal reflection by about 90 degrees. At resonance, the resonant signal will interfere constructively with the signal that is normally reflected by the casing. This behavior can be modified using either a more complex type of resonant circuit or an active circuit. For example, with another inductor and a capacitor, a bandpass-type filter can be used. The phase and amplitude behavior can be used to give the casing a signature as the frequency of the ranging signal is varied, making it possible to uniquely identify a resonator. As noted above, the resonators can be unique well identifiers or can be set up so as to identify specific portions along a single well.

As illustrated in FIG. 3B, an alternative resonant structure 132b is constructed using an active circuit (i.e. a circuit that is actively powered by a power source). In this embodiment, gyrator 320—an active circuit that behaves as a capacitor through the use of an inductor—is placed in series with an inductor 322, resulting in a resonant system. Inductors 322 and 324 are wound around well casing 110 in such a manner as to induce a voltage in each inductor. Power for the active circuit is provided from an external source, such as by power supply (not shown), which may be located within beacon 130 or externally located at or near the surface and connected within or along drill string 210.

Figure 6:
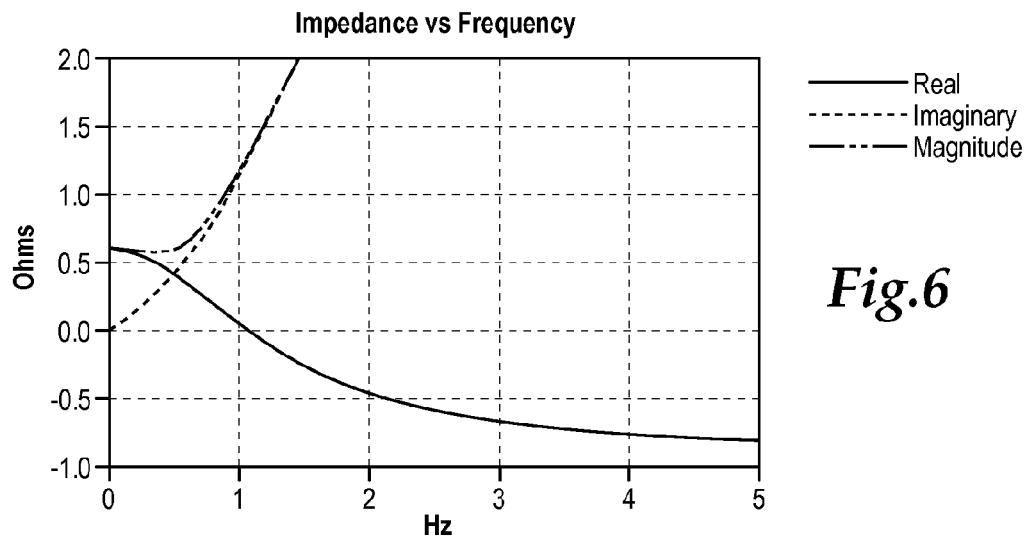
FIG. 6 is a plot of an impedance experienced by the voltage source of a resonant structure.

In general, various parameters, including the inductance or resistance of each element are selected to produce a particular resonant behavior. For example, when inductors 322 and 324 are wound such that $$L1*V2=-L2*V1,$$

where L1 is the inductance of inductor 322 and L2 is the inductance of inductor 324, a resonance can be achieved at 1 Hz with the following parameters:
L1=0.3 H
L2=0.01 H
R1=0.05 Ω
R2=1 Ω,
where R1 is the resistance of resistor 326 and R2 is the resistance of resistor 328. Resonance at 1 Hz is demonstrated in a plot of the impedance seen by the voltage source V1, illustrated in FIG. 6. In various embodiments, inductance values range from 0.05 to 2.5 H, and resistance values typically range from 0.05 to 3 Ω.

Such a configuration is used in various embodiments when energy is available to operate the amplifier. For many applications, energy is supplied by one or more batteries, for example a silver cell battery, such as a SR44W silver oxide battery. These are compact and have a long shelf life, and a sizable battery pack could be provided to drive a gyrator circuit.

In some embodiments, rather than the circuit being continuously driven, the circuit is normally off, but the larger of the inductors is used as an antenna. The output of this antenna is continuously monitored using a circuit drawing a minimal amount of power. When the circuit detects a signal above a pre-determined threshold, the circuit may activate a gyrator circuit. To conserve battery life, the circuit turns off the gyrator after a period of time, and operates in a low power state. After another period of time, the circuit determines if the signal is still present, and reactivates the gyrator circuit in response, and thereby switches to a high power state. A similar strategy can also be carried out with a passive resonant structure. In this case, the resonant structure is used with a power amplifier to considerably increase the range over which the resonant signal can be received.

In various embodiments, the inductors of the resonant structure may be of several forms. The inductors may be of various types, such as toroidal inductors or solenoids. FIG. 7 illustrates an exemplary toroidal inductor 700. Two parts 720 and 740 of the toroidal inductor 700 are wound around two parts of a laminated core 702 and 704. In some implementations, the two portions 702 and 704 can be clamped together around a section of pipe casing and held in place, for instance with an bracket or with a strap. Laminations 706 are stacked in such a way that the mating faces are interleaved. When fully assembled, each lamination 706 is in intimate contact with an adjacent lamination 706. Toroidal inductor 700 is electrically connected to the rest of resonant structure 132 through ends 708 and 710. In some implementations, the inductors of resonant structure 132 may also be solenoids, embodied by electrically conductive wire wrapped helically around a cylindrical core, such as casing 110. In some implementations, the resonant structure 132 may contain one or more types of inductors.

Inductors are constructed in various embodiments with an electrically conductive material, such as copper wire, and typically range in value from about 0.05 to about 2.5 H. Parameters such as the gauge of the wire, number of turns of wire, and length of the inductor, may be varied to construct an inductor with the desired characteristics. For example, given a casing with an outside radius of 6.5 inches, an inside casing radius of 6.125 inches, and a magnetic permeability of 200, a length of 6 gauge copper wire may be wound approximately 1,707 times within a 7 meter length along the casing to produce a 1 H inductor with a Q factor of 22 when made to resonate at 10 Hz, where the resistance of the winding is 2.85Ω. Alternatively, a length of 6 gauge copper wire may be wound approximately 171 times within a 0.7 meter length along the casing to produce a 0.1 H inductor with a Q factor of 22 when made to resonate at 10 Hz, where the resistance of the winding is 0.285Ω. Generally, lower Q values may be achieved with higher wire gauges. The relationship between these properties and the performance characteristics of the resonant structure are described in greater detail below.

In some embodiments, the electrically conductive material is wound around the outer surface of a casing. In some embodiments, the electrically conductive material is wound around the inner surface of a casing. In some embodiments, the electrically conductive material is wound around within the casing, such that it is wound in a region between the outer and the inner surfaces of the casing.

An inductor's design may be varied to produce a field with particularly desirable characteristics. For example, as illustrated in FIG. 8A, solenoids or toroidal inductors can be wound using one or more individual conductive elements. These conductive elements may be wound with turns that are not orthogonal to the axis of the casing, for example as in inductor 802a wound with turns that are not orthogonal to the axis of the casing 804a. Moreover, two or three solenoids or toroidal inductors may be wound at angles that are 90 degrees apart. These windings may be separated, as illustrated in FIG. 8B, where inductor 802b is wound with separated turns, or on top of each other, as illustrated in FIG. 8C, where inductor 802c is wound with overlapping turns. Referring to FIG. 8D, multiple solenoids may alternatively be wound orthogonal to each other, with some solenoids separated from each other and others wound one or top of the other, for example inductor 802d wound with a combination of different arrangements of turns. These different winding configurations are used to alter the symmetry of the induced field around the well casing.

Capacitors of beacon 130 are generally large (approximately 10 nF to 0.5 F), and may be of various types, such as low voltage niobium oxide capacitors.

Components of beacon 130 may be protected in various ways. For example, in some embodiments one or more components of beacon 130, such as the inductors, are covered with a protective non-conductive material, such as epoxy, plastic, resin, carboxylated nitrile rubber, ceramics, Teflon, ePTFE, or Capton. In some embodiments, these components are wholly or partially contained within a non-conductive housing, and the housing placed around well casing 110. In this manner, particularly sensitive components of beacon 130, including its inductors, are protected from damage during the construction and operation of the well.

FIG. 9 illustrates the operation of ranging tool 120. Ranging tool 120 is attached to drill string 210, which connects to a drill unit 208. Ranging tool 120 includes magnetic field inducer 122 and magnetic field detector 124, both mounted in proximity to drill unit 208. Ranging tool 120 is powered by a power supply, which may be within ranging tool 120, or externally located at or near the surface and operably connected to ranging tool 120 through drill string 210. Magnetic field inducer 122 induces a magnetic inducing field 214, which induces a current 216 upon well casing 110 When the frequency of magnetic field is at or near the resonant frequent of resonant structure 132, resonant structure 132 resonates. The induced current, the field in the casing, and the resonating structure establish an oscillating field that is detected and measured by magnetic detector 124.

The distance and direction between the magnetic detector 124 and resonant structure 132 of beacon 130 is determined by measuring the magnetic response field. Without wishing to be bound by the theoretical approximation, consider for example the resonant structure of FIG. 10, which includes a solenoid 1002 on a section of casing 1004. The solenoid carries current I and has N turns of coiled wire with essentially 0 thickness, so that the inner and outer radius of the coil is $r_b$. The symmetry axis of the cylinder is taken to be the z-axis, with the center of the coil at z=0. For approximation purposes, the coil may be thought of as infinite in length. However for calculation purposes, it can be assumed to extend from z=0 to z=$L_1$+L+$L_2$. N turns of wire carrying current I extend from z=$L_1$ to z=$L_1$+L and fill the space. The inner radius of the casing is $r_a$ and the outer radius of the casing is arbitrarily smaller than $r_b$, such that the current is wound at radius $r_b$, just beyond the outer radius of the casing. The permeability of the pipe material is $\mu_1$, the permeability of the medium surrounding the casing and coil is $\mu_2$. In this example, the medium is taken to be infinite, homogenous, and isotropic. Differential elements of current are located in Cartesian coordinates by (x,y,z) and in cylindrical coordinates by (ρ,θ,z). The observation point is located in Cartesian coordinates by (x',y',z') and in cylindrical coordinates by (p',φ,z').

Thus, the current density is given by $$\vec{J} = f(x) = \begin{cases} \frac{NI}{L}\delta[\rho - r_b]\hat{\theta}, & L_1 \leq z \leq L_1 + L \\ 0, & \text{otherwise} \end{cases},$$

where $\hat{\theta}$ is a unit vector directed along an infinitesimal element of current and is the unit angular vector.

Calculation of the magnetic field can be divided into two problems: (1) calculation of the background field established by the current in the coil (not to be confused with the field that induces the current in the coil), and (2) calculation of the field induced in the casing by the background field.

Beginning with Problem 1, referring to FIG. 11, the magnetic field H with respect to a solenoid 1002 on a section of casing 1004 at observation point (x',y',z') may be expressed as:

$$\vec{H}[x', y', z'] = \frac{1}{4\pi}\int \frac{\vec{J}[x, y, z] \times \hat{r}}{r^2} dV,$$

where $$\vec{r} = (x' - x)\hat{\imath} + (y' - y)\hat{\jmath} + (z' - z)\hat{k}.$$

Thus, $$\vec{H}[x', y', z'] = \frac{J}{4\pi}\iiint \frac{(\delta[\rho - r_b]\hat{\theta} \times ((x' - x)\hat{\imath} + (y' - y)\hat{\jmath} + (z' - z)\hat{k}))}{((x' - x)^2 + (y' - y)^2 + (z' - z)^2)^{\frac{3}{2}}} \rho d\rho dz d\theta,$$

where $$J = \frac{NI}{L}.$$

In the above expression, J is the magnitude of the current density where it is non-zero, N is the number of turns of wire, assumed to completely occupy the space L, I is the current carried by the wire, and J is set up so that the integral is over ρ and z=N*I.

The field should have radial symmetry. When the problem is expressed in cylindrical coordinates, with the exception of the unit vectors, the radial coordinate can be calculated as the x-component with a polar angle of 0, and the y-component vanishes. Evaluating the integrals, $$H[\rho', 0, z']_x = \frac{r_b J}{4\pi}\int_0^{2\pi} \cos\theta \left( 1/((\rho')^2 + r_b^2 + (z' - L_1 - L)^2 - 2r_b\rho'\cos\theta)^{\frac{1}{2}} - 1/((\rho')^2 + r_b^2 + (z' - L_1)^2 - 2r_b\rho'\cos\theta)^{\frac{1}{2}} \right) d\theta,$$

$$H[\rho', 0, z']_y = 0,$$

$$H[\rho', 0, z']_z = \frac{r_b J}{4\pi}\int_0^{2\pi} (r_b - \cos\theta\rho') / \left( r_b(r_b - 2\rho'\cos\theta) + \right.$$

$$\left. \left( \frac{L + L_1 - z'}{\sqrt{(L - L_1 - z')^2 + r_b + (\rho')^2 - 2r_b\rho'\cos\theta}} - \frac{L_1 - z'}{\sqrt{(L_1 - z')^2 + r_b^2 + (\rho')^2 - 2r_b\rho'\cos\theta}} \right) \right) d\theta.$$

Figure 12:
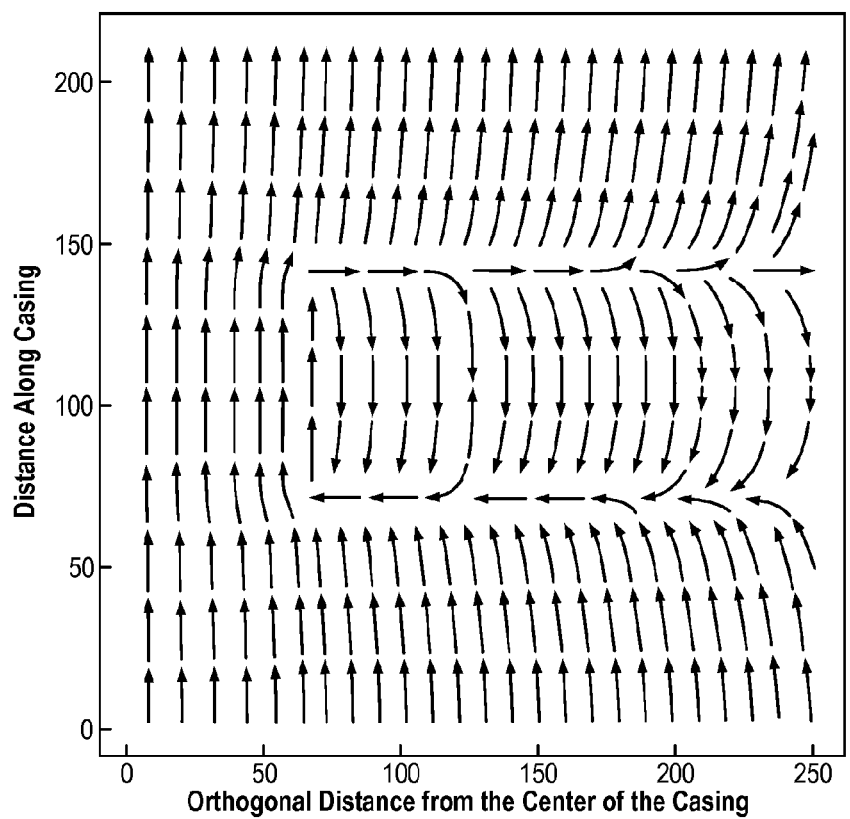
FIG. 12 is a vector plot of the magnetic field around a solenoid.
Figure 13:
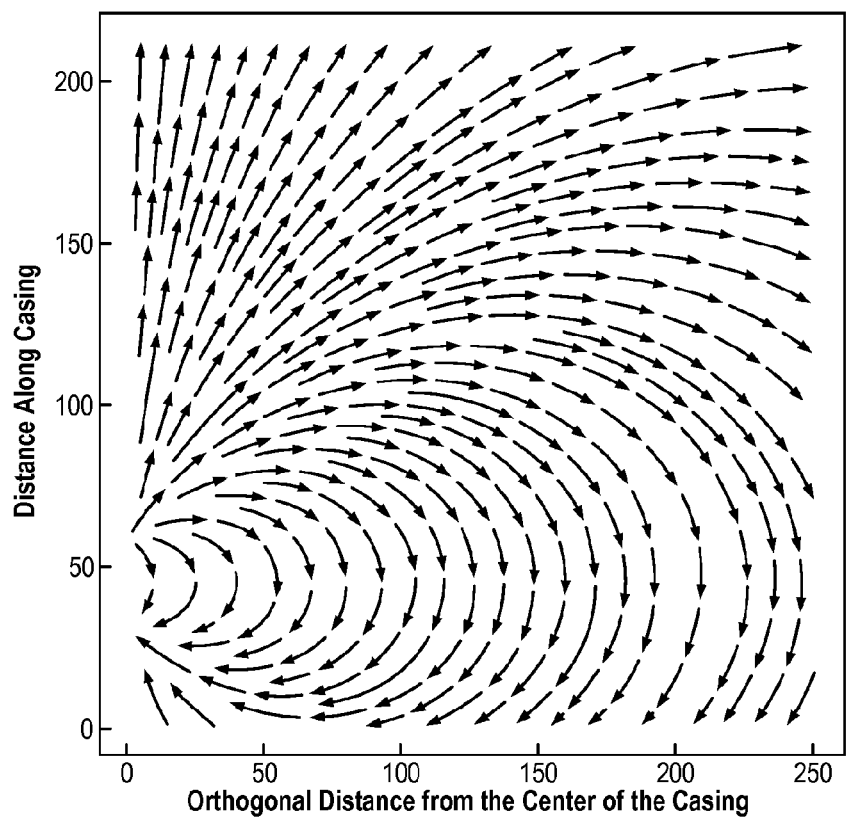
FIG. 13 is a vector plot of the magnetic field around a solenoid.

FIG. 12 is a vector plot obtained using these equations with radii from 0 to about 4 solenoid radii and across the distance of 3 times the length of the solenoid, centered on the solenoid. FIG. 13 is a vector plot obtained using these equations when the field is plotted over a radial range of an z-axis range of 25 meters, roughly 150 times the solenoid radius and 3.5 times the solenoid length.

Figure 14:
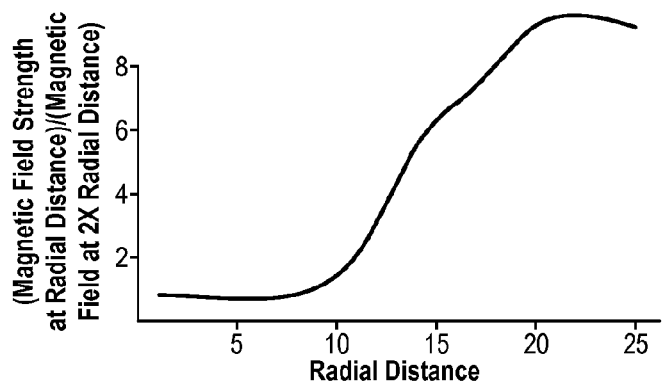
FIG. 14 is a plot of the ratio of the file strength at two different radii that differ by a factor of 2 versus an integer used to specify the radius.

As a test before introducing the inhomogeneity of the casing, the inverse cube behavior was evaluated at several points. FIG. 14 is a plot of the ratio of the field strength at two different radii that differ by a factor of 2 vs. an integer used to specify the radius. The radial and axial coordinates were equal in the field calculations. The initial distance from the center of the solenoid was 0.84 meters, while the final distance was 53.8 meters. Each coordinate varied as $2^{.25*n-1}$ for n varying from 1 to 25. At greater distances, there are indications that the numerical integrals were not converging properly. However, while the field first dies off slowly, it eventually varies as an inverse cube field, as is expected for a dipole source. Working in the asymptotic limit of large values of ρ and z, $$H[\rho, 0, z]_x \to \frac{r_b^2 J}{4}\left( \frac{\rho z L}{(r_b^2 + z^2 + \rho^2)^{5/2}} \right),$$

$$H[\rho, 0, z]_z \to \frac{r_b^2 J L}{2(r_b^2 + z^2 + \rho^2)^{3/2}},$$

$$H_t[\rho, 0, z] \to \frac{r_b^2 J * L}{(r_b^2 + z^2 + \rho^2)^{3/2}} \frac{\sqrt{5}}{4},$$

where $H_t$ is the total field strength.

Figure 15:
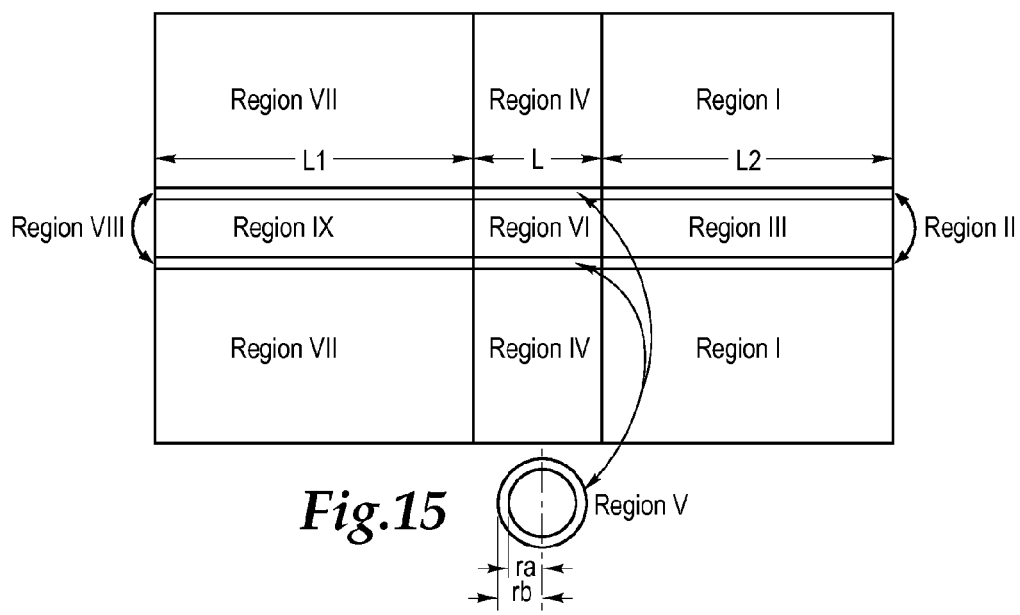
FIG. 15 shows the solution regions around an embodiment of a well casing.

Continuing with Problem 2, calculation of the field induced in the casing by the background field may be divided into 9 regions, as illustrated in FIG. 15. Assuming that no currents are contained within the casing, the H induced field can be expressed in terms of a scalar potential satisfying the following conditions:

$\nabla^2 \varphi = 0$ for all points not on the boundry, $$\mu_2 \left( \frac{\partial \varphi}{\partial n} \right)_+ - \mu_1 \left( \frac{\partial \varphi}{\partial n} \right)_- = (\mu_1 - \mu_2) H_r \text{ at } r = r_b$$

and in the region $L_1 \leq z \leq L + L_1,$ $$\mu_1 \left( \frac{\partial \varphi}{\partial n} \right)_+ - \mu_2 \left( \frac{\partial \varphi}{\partial n} \right)_- = (\mu_1 - \mu_2) H_r \text{ at } r = r_a$$

and in the region $L_1 \leq z \leq L + L_1.$

Figure 16:
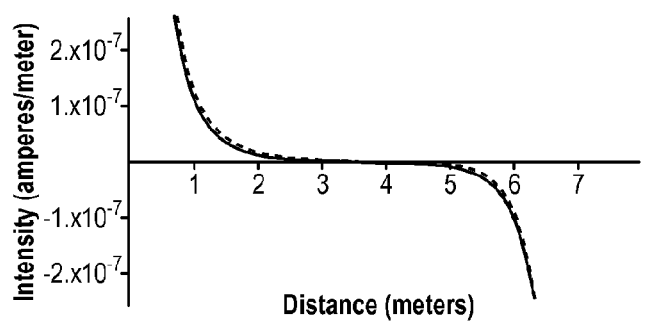
FIG. 16 is a plot of an approximation function for magnetic field strength.

Solving by separation of variables yields the generation solution $$\varphi[r,z] = (AJ_0[\sqrt{C}r] + BY_0[\sqrt{C}r])(Ve^{\sqrt{C}z} + We^{-\sqrt{C}z})C \neq 0,$$

where the specific values A, B, V, W, and C may be different for each region. The analysis that resulted in satisfying the boundary conditions is complex and will only be summarized. It is first noted that the solenoid approximated as a current sheet in the formulation above, cannot serve as a boundary in the solution. The solenoid was specified to have a radius an arbitrary small amount larger than the outer diameter of the casing, an assumption that is true under almost all practical applications. It was shown that for regions I, II, and III, the solution for $H_r$ at a fixed value of $\rho$ near the solenoid is well approximated by an exponential that decays with z. Similarly, the value of $H_r$ at a fixed value of $\rho$ near the solenoid in regions VII, VIII, and IX is approximated by an exponential that decays as z is decreased. In addition, it was shown that to good approximation, the value of $H_r$ in regions IV, V, and VI is a sum of exponentials with a common value of C and with W=-V. An exemplary plot of $H_r$ is shown in FIG. 16, where the horizontal axis is the distance along the casing in the area covered by the solenoid at the outer diameter of the casing, and the vertical axis is the intensity $H_r$. The plot illustrates how well the solution is approximated by a combination of exponentials as indicated above. A different fit must be made to the exponential function any time the material or geometric properties of the boundary constraints are modified. This was examined over a wide range of boundary conditions with excellent agreement between the exponential form and the value of $H_r$.

Figure 17:
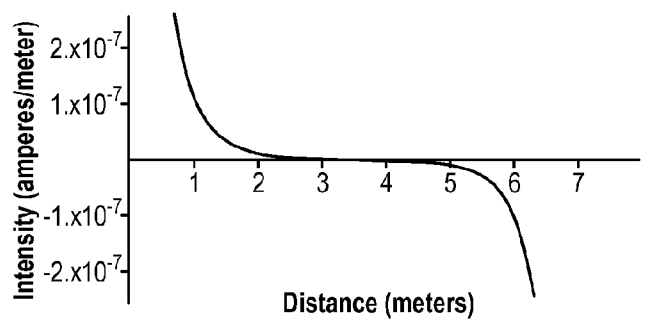
FIG. 17 is a plot of boundary conditions for an approximation function for magnetic field strength.

Upon satisfying the boundary conditions, it is possible in each case to achieve a solution that is, for all practical purposes, exact. This is demonstrated in FIG. 17, which is a plot comparing the left and right sides of the boundary. The horizontal axis is the distance along the casing in the area covered by the solenoid at the outer diameter of the casing, and the vertical axis is the intensity $H_r$. This plot includes a curve corresponding to the boundary condition function on the left side of the boundary condition function as a function of z, and a curve corresponding to the boundary condition function on the right side of the equation as a function of z. The curves overlay and there is never a situation in all of the analyses when this is not possible.

In the solution, the value of C is the same in all regions. This is generally expected since, in the analogous problem where wave propagation is considered, it is necessary to use the same value of C across boundaries. The values of A and B vary by region. The values of A and B obtained using this method are well-behaved functions of the system parameters.

Figure 18A:
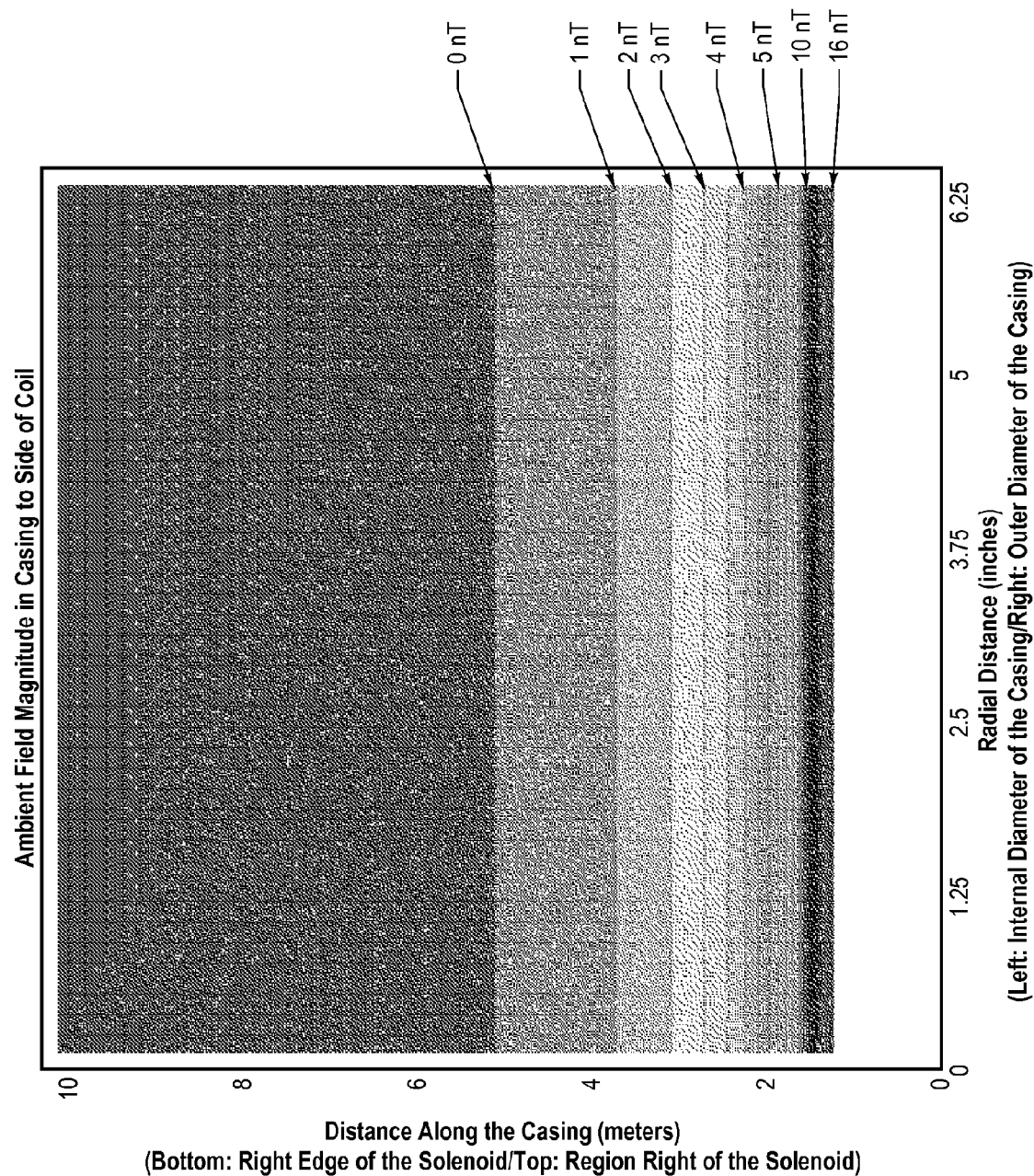
FIGS. 18A-C show the magnetic field within and around an embodiment of a casing.
Figure 18B:
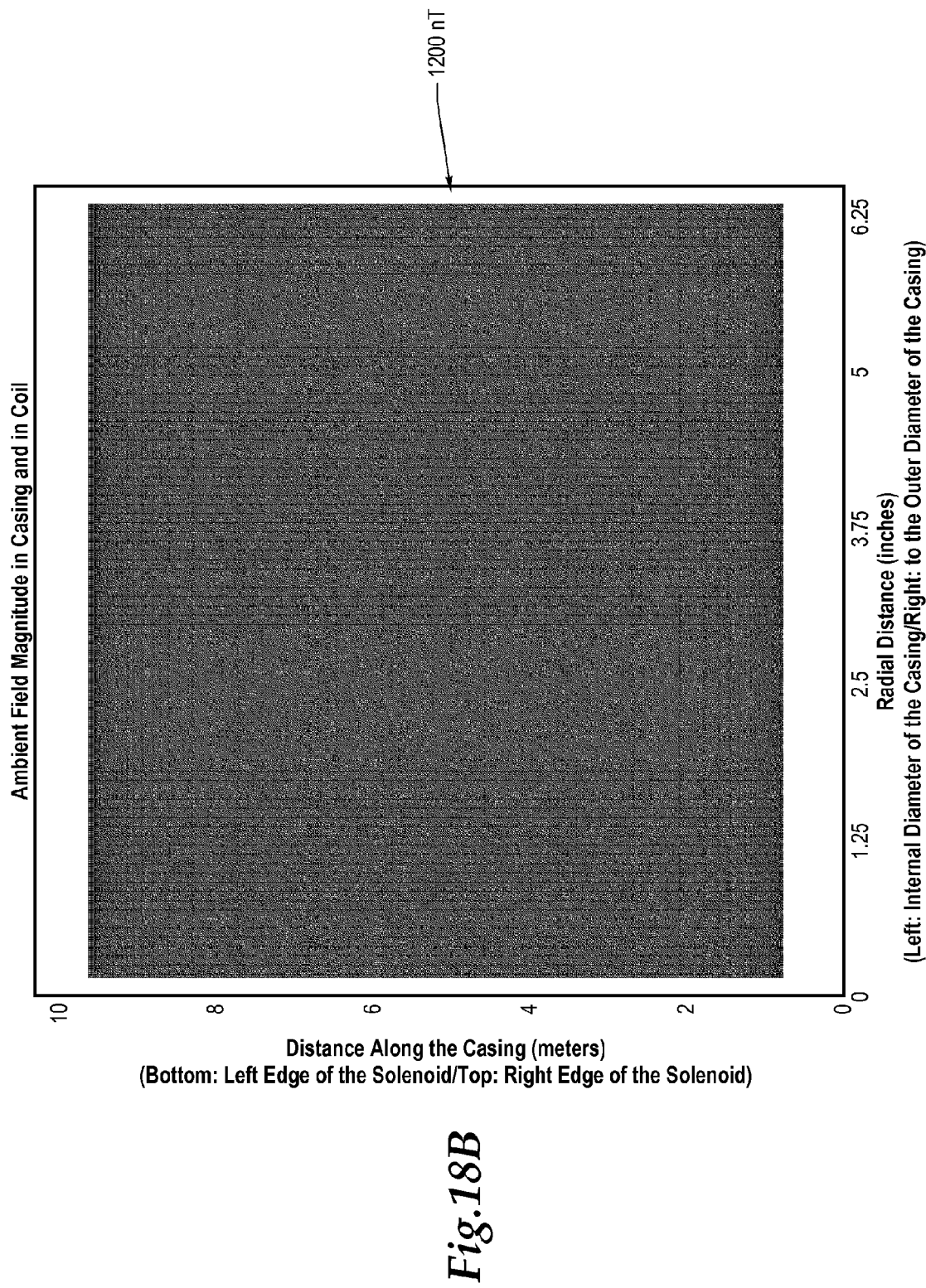
Figure 18C:
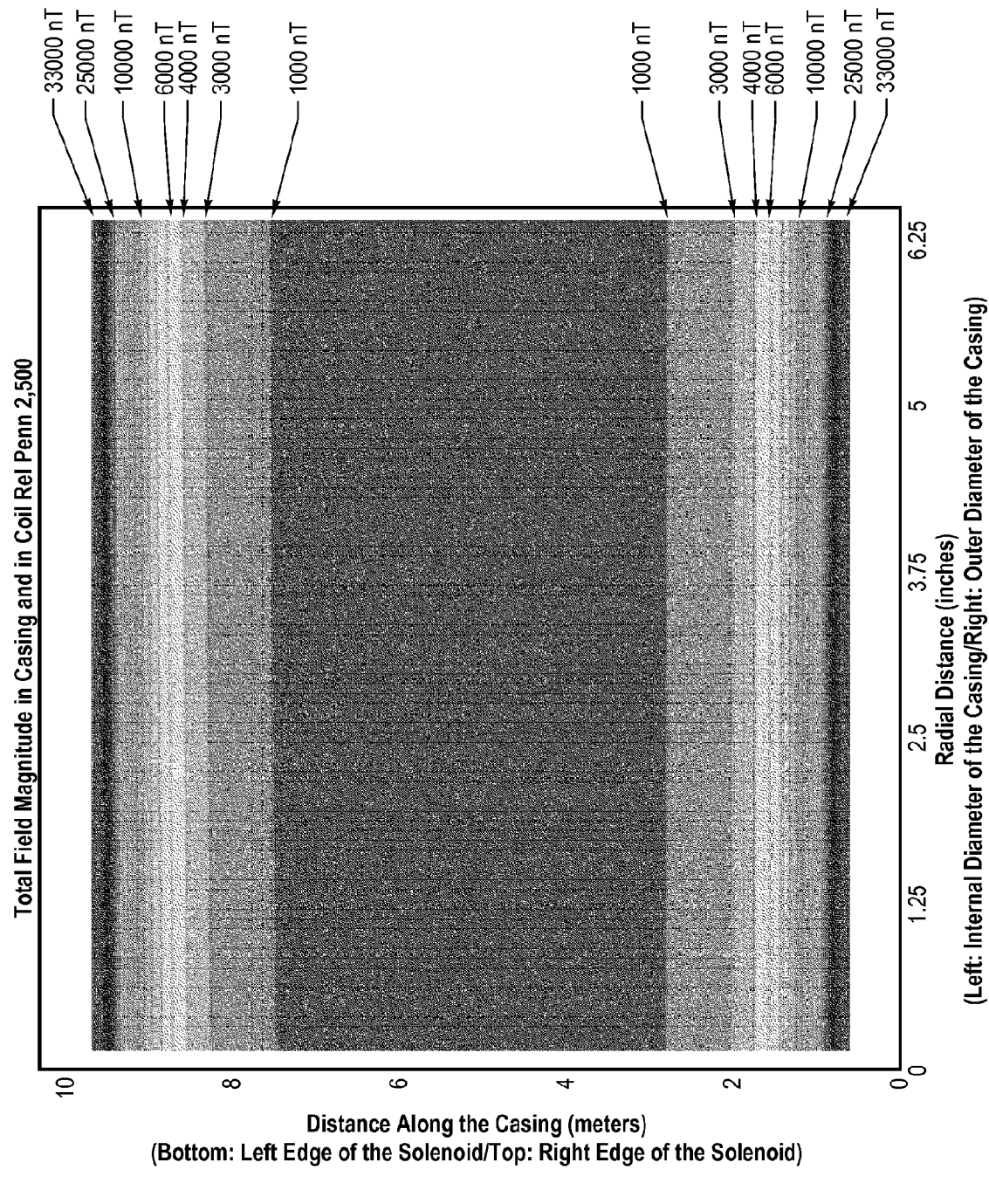

As Bessel functions cannot in general provide a solution to this problem when it is treated as a DC problem, it is necessary to also examine the radial range over which the solution is non-oscillatory. This was determined to be on the order of twice the radius of the coil, which is sufficient to investigate the field in the casing The field induced by the background field, along with the background field and the total field, is illustrated in FIGS. 18A-C. FIG. 18A is a contour plot of the background field to the side of the solenoid and in the casing, where the vertical axis represents the distance from the right side of the solenoid and the horizontal axis represents the radial distance from the internal diameter of the casing to the outer diameter of the casing. FIG. 18B is a contour plot of the background field within the solenoid and within the casing, where the plot is vertically centered over the solenoid such that the left edge of the solenoid is at the bottom of the vertical axis and the right edge of the solenoid is at the top of the vertical axis. These plots were obtained using the coefficient of J=1 in the above equations. The horizontal axis corresponds to the z-axis, while the vertical axis corresponds to the radial coordinate, from the inner to the outer diameter of the casing. The contour lines are in nT. From these plots, it is evident that the background field decays rapidly to the side of the casing. FIG. 18C is a contour plot of the total field obtained within the casing with a relative permeability of 2,500.

Figure 19:
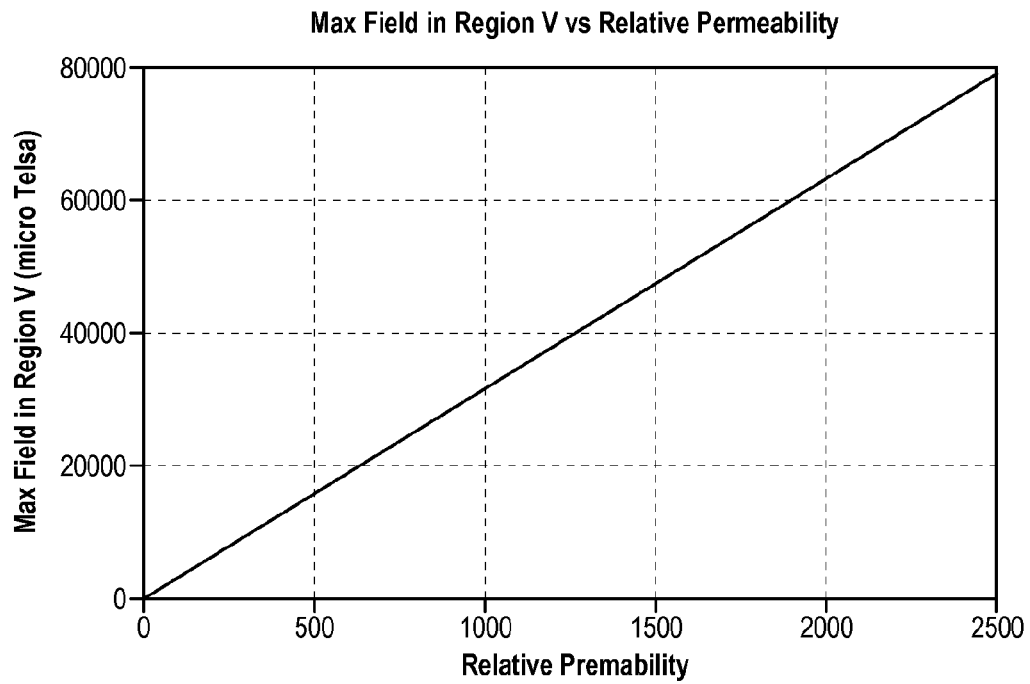
FIG. 19 is a plot of the maximum field strength or an induced field as a function of permeability.

While the contour lines may be difficult to interpret, the maximum field strength may be plotted as a function of the permeability, as illustrated in FIG. 19 where the vertical axis is the maximum field strength in nT and the horizontal axis is the permeability. To a good approximation, this is a straight line. The minimum field strength varies very little with permeability. As the relation between the inducing field and the current induced in the solenoid is given by $$I = \frac{AN}{2\pi R} \omega B_i,$$

where A is the cross-section area, N is the number of turns, R is the resistance, $B_i$ is the inducing field, and $\omega$ is the frequency of the induced field, from which it is concluded that $$J = \frac{AN^2}{2\pi RL} \omega B_i.$$

Thus, at 10 Hz and with J=1, $B_i$=68161.5 nT. It is anticipated that the casing will have a relative permeability of 700. Thus, the expected effect, while not as great as that of the inducing field, is expected to be significant. If the permeability can be made as high as 2,500, the response will be close to that of the inducing field.

These calculations neglect the effect of the skin effect in the casing, as both the inducing field and the induced field will be reduced according to the factor that the skin effect reduces the effective thickness of the casing. The skin depth at 10 Hz is about 0.25 inch with a relative permeability of 700. Thus, less than half of the casing will actually participate in developing a signal. This applies to all magnetic ranging technologies.

The operating frequency of the resonant structures and ranging tool is dependent on the surrounding environment, and in some embodiments is between about 5 Hz and about 50 Hz. However, a broader range of between about 1 Hz and about 1000 Hz may be used depending on the specific resistive and conductive properties of the formation in the location of use and the expected distances between new and established well structures. In embodiments with multiple beacons of differing resonant frequencies, the frequency separation between the resonant frequencies of each beacon is approximately equal to or greater than 0.1 Hz. The frequency separation may be increased or decreased, depending on application and intended use.

Figure 20:
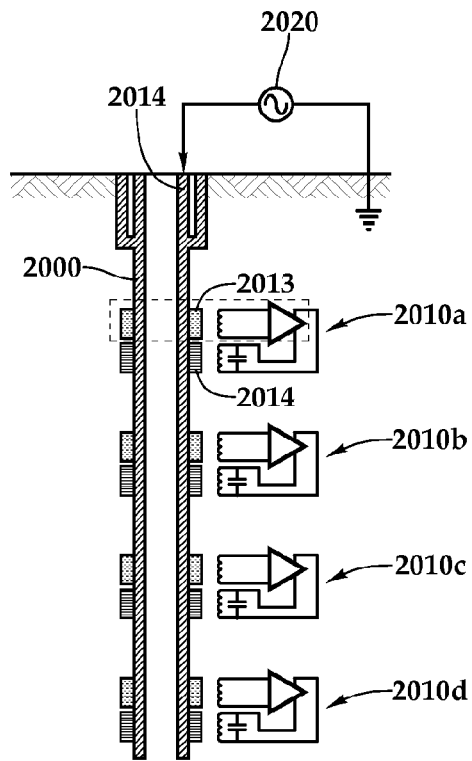
FIG. 20 is another embodiment of a well casing detection system.

In some embodiments the beacons are activated using a current induced along the drill string from the earth's surface. This may be done, for example, to set up a ranging signal around the well casing. Referring to FIG. 20, beacon 2010a includes resonant structure 2014 and signal detection circuit 2012. Several similar beacons 2010b-d are installed along the length of well casing 2000. A surface current source 2020 sends current down the length of well casing 2000, either along well casing 2000 or along a drill string. Signal detection circuit 2012 includes a toroidal inductor 2013 arranged to detect the signal current generated by current source 2020 along well casing 2000. Upon detection of a signal current, signal detection circuit 2012 activates the resonant structure 2014. Resonant structure 2014 is either an active or passive circuit design, as described above.

Referring to FIG. 20, in some embodiments, each of the beacons 2010 resonate at the same resonant frequency $\omega_0$ and current source 2020 induces a current of frequency $\omega_0$, such that all of the beacons resonate when the current source is applied. In some embodiments, each of the beacons 2010 resonate at different resonant frequencies and current source 2020 induces a current of a swept frequency range, such that each of the beacons resonate discretely. In other embodiments, current source 2020 induces a current in which the frequencies stepped are stepped as a function of time. Beacons of different resonant frequencies may be used to mark specific portions of well casing 2000, or to mark the distance from the surface.

While current source 2020 is illustrated in FIG. 20 as being on the surface and electrically connected to the wellhead 2014 of casing 2000, current source 2020 may be located elsewhere along the casing 2000, and may be electrically connected to other points of casing 2000. For instance, in some embodiments, current source 2020 may be positioned elsewhere along casing 2000, and connected through a wire to the casing 2000 at a point below the wellhead 2014. In some embodiments, more than one electrical connection may be used. For instance, in some embodiments, current source 2020 may be connected through a first wire to the casing at the wellhead 2014, and connected through a second wire to the casing at a point below the surface. In these embodiments, a current is induced through these two wires. In these embodiments, the second wire may be run down the inside of the casing 2000. The current along the casing and in the second wire will contribute to the overall magnetic field, but the contribution from these currents to the magnetic field will generally be small in the region of space in which a response from the field from the solenoid(s) driven by this current can be distinguished from the background field. Alternatively, a correction can be applied based on Ampere's law. In some embodiments, one or more of the wires may be connected on an "on demand basis," such that the connection may be reversibly connected and disconnected before, during, or after other operations are being performed on the well structure. In some embodiments, the well casing 2000 may be formed from two or more sections of casing with insulated joints between. A pair of wires can be connected to each side of the joints, such that current can be induced along the casing using the pair of wires.

Figure 21:
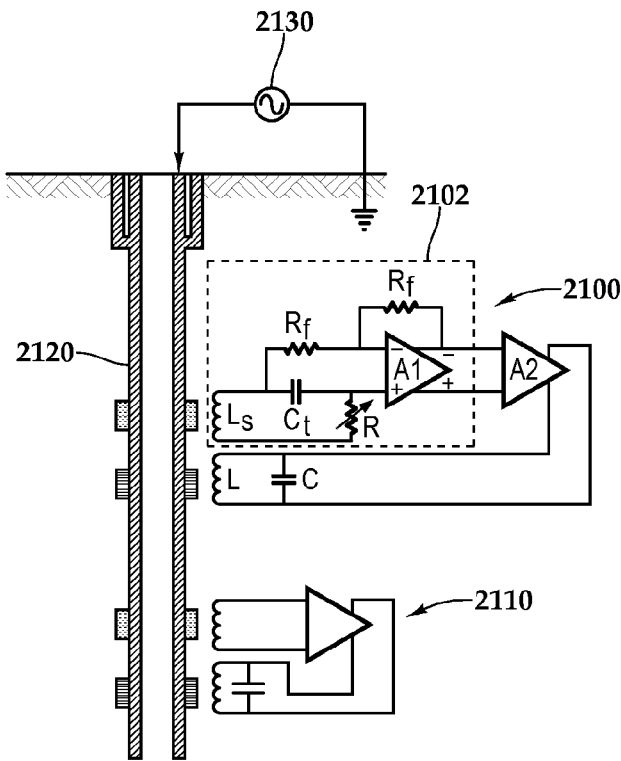
FIG. 21 is another embodiment of a well casing detection system.

In some embodiments, the phase of one resonant structure 2014 can be changed relative to that of another resonant structure. Referring to FIG. 21, a system with two resonant structures 2100 and 2110 are positioned along the length of well casing 2120. A surface current source 2130 sends current down the length of well casing 2120, either along well casing 2120 or along a drill string. Resonant structures 2100 and 2110 have the same resonant frequency $\omega_0$, such that a current of $\omega_0$ along well casing 2120 causes both to resonate. Resonant structure 2100 includes a delay circuit 2102, for simplicity illustrated with an amplifier without grounding elements. Resistors $R_f$ give unit gain for the amplifier A1, and are chosen for stability and minimum power consumption. The transfer function for amplifier A1, in terms of the Laplace transform, is given by $$\frac{V_0}{V_i} = \frac{1 - R \cdot C_t s}{1 + R \cdot C_t s}.$$

To first order, this is the same as the Laplace transform for a delay of $\tau$, which is $$\frac{V_0}{V_i} = e^{-\tau \cdot s},$$

where $$\tau \equiv R \cdot C_t.$$

R is a variable resistor, and may be obtained using another circuit such as a programmable resistor, which could be controlled with a microprocessor that is activated whenever the circuit is activated. The resistor varies the phase of the upper resonator relative to that of the lower resonator for a period of time when both resonators are active. For example, if resonant structures 2100 and 2110 both resonate at 10 Hz and $C_t$ is 1 µF, with R set of 1000Ω, resonant structure 2100 will have a phase that is delayed relative to the lower circuit by $0.02\pi$ radian, or 3.6 degrees (the time delay is $R \cdot C_t$, or 0.001 s. Increasing R to 50,000Ω results in a 180 degree relative phase shift. This can be used to sweep a lobe of maximum returned signal from the two resonant structures vertically through the space surrounding the casing.

Figure 22A:
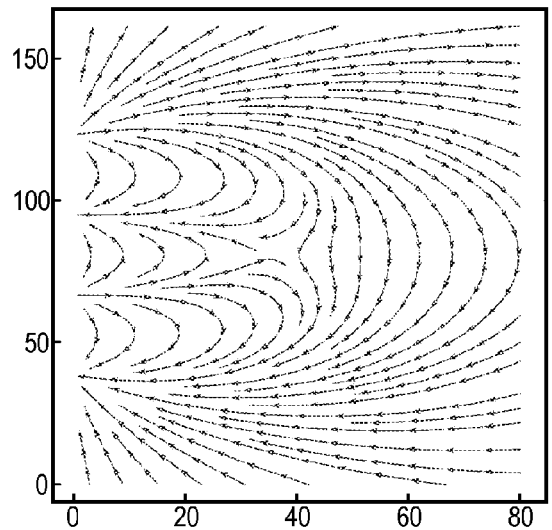
FIGS. 22A-P show the magnetic field around two example resonant structures as a function of phase.
Figure 22B:
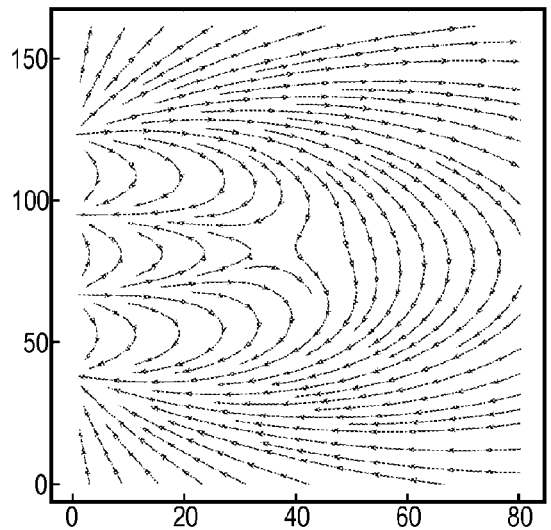
Figure 22C:
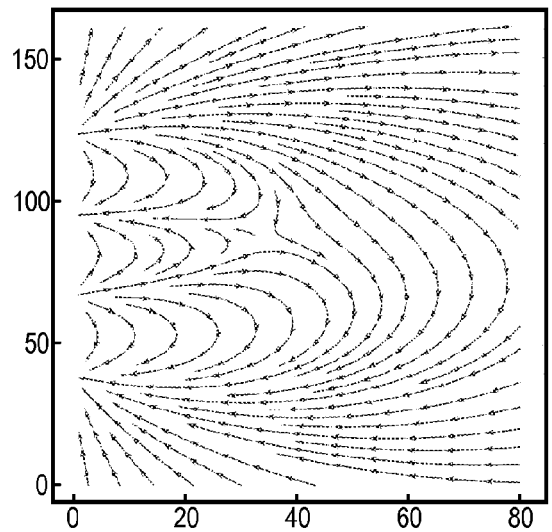
Figure 22D:
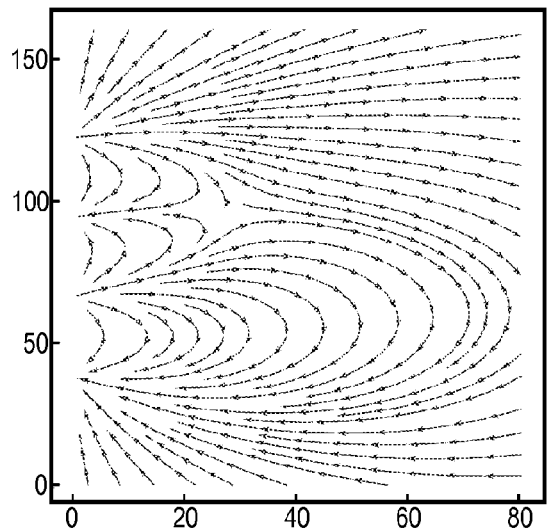
Figure 22E:
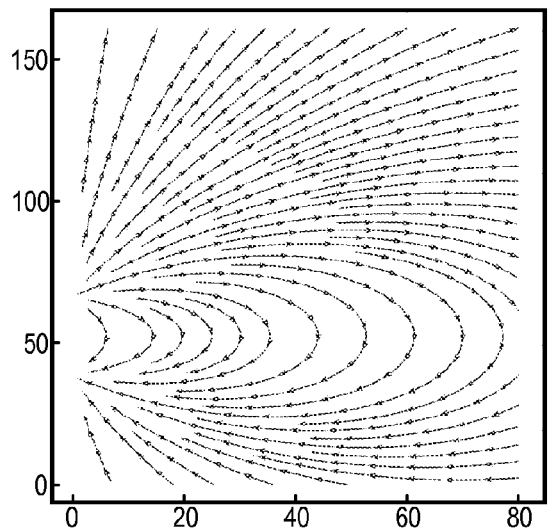
Figure 22F:
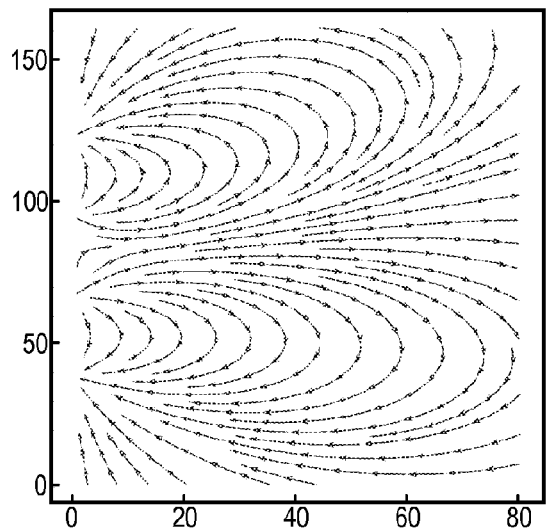
Figure 22G:
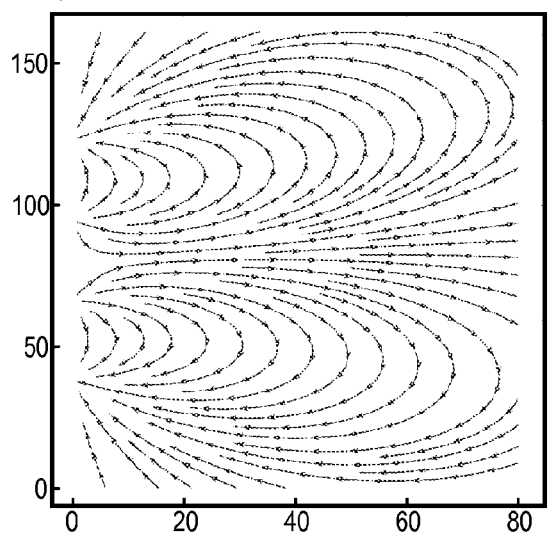
Figure 22H:
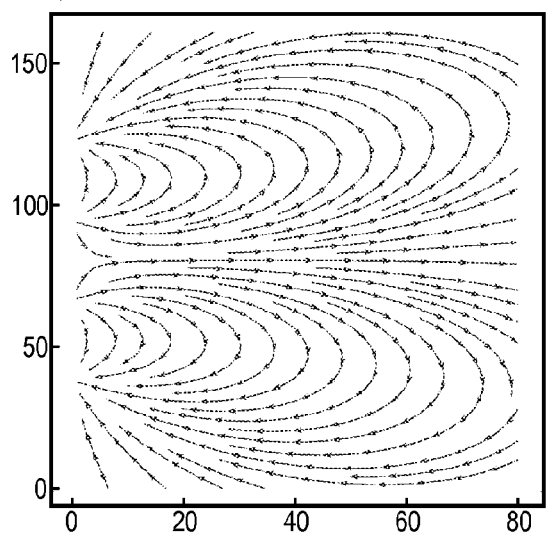
Figure 22I:
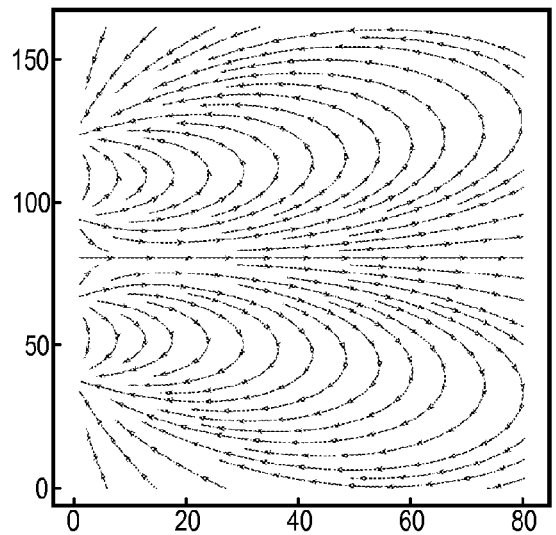
Figure 22J:
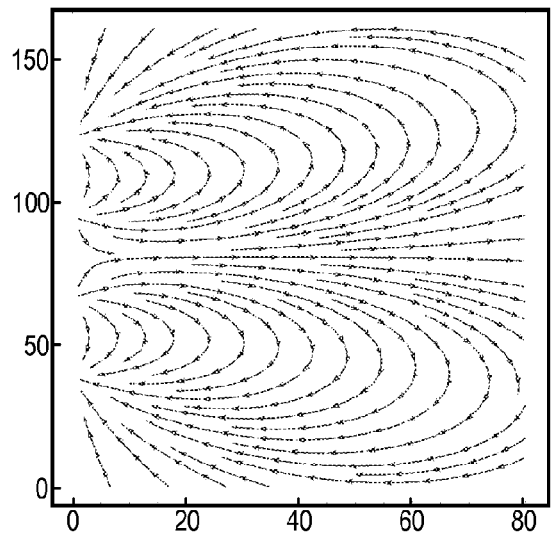
Figure 22K:
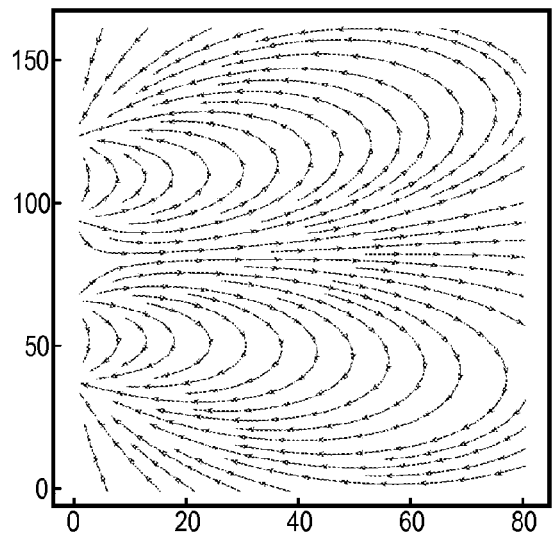
Figure 22L:
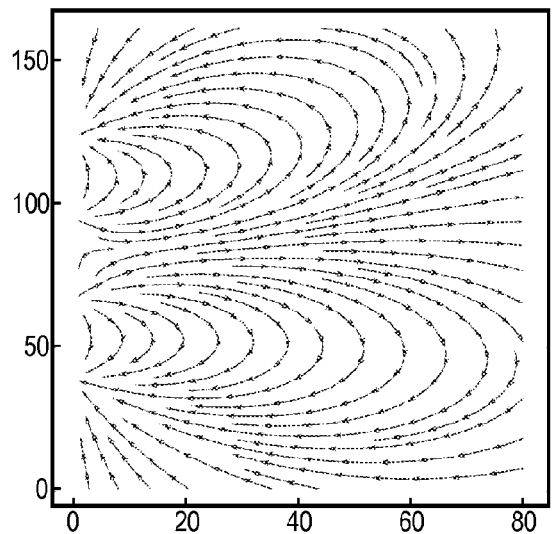
Figure 22M:
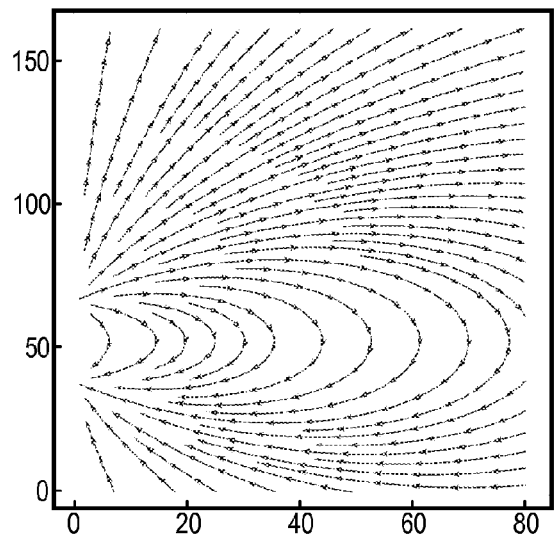
Figure 22N:
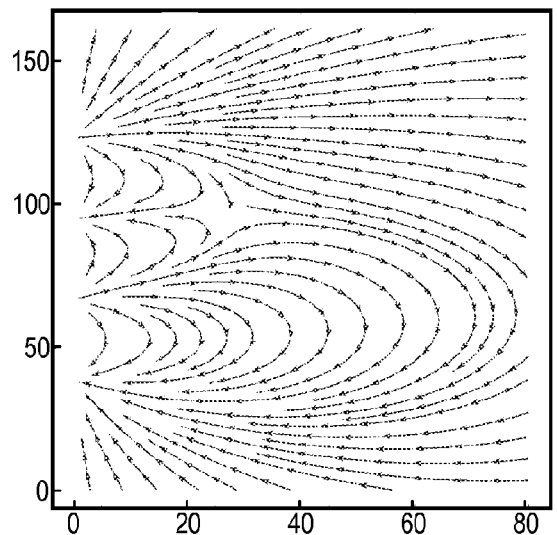
Figure 22O:
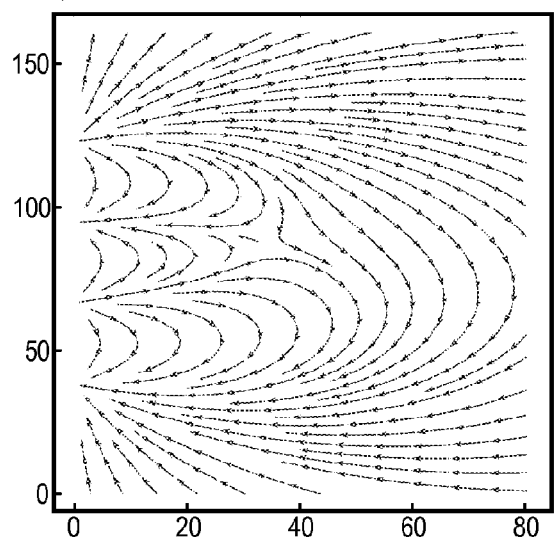
Figure 22P:
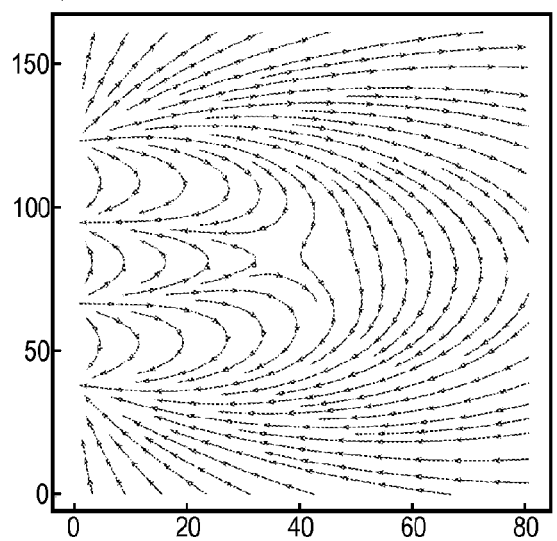
Figure 23A:
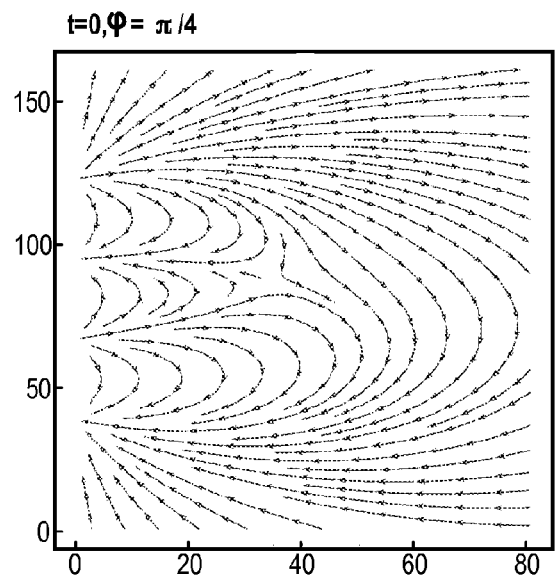
FIGS. 23A-P show the magnetic field around two example resonant structures as a function of time.
Figure 23B:
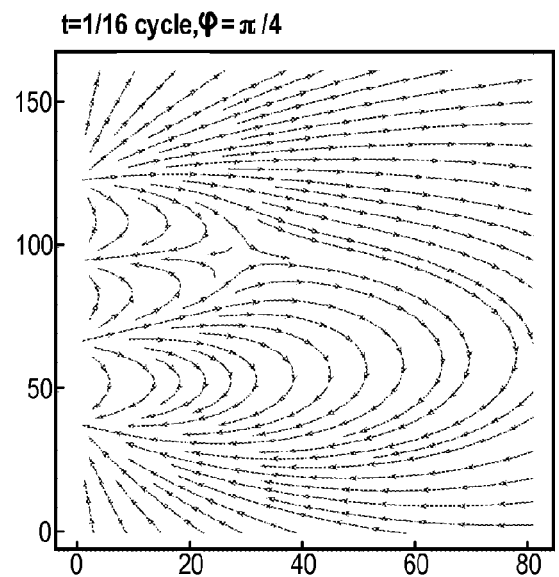
Figure 23C:
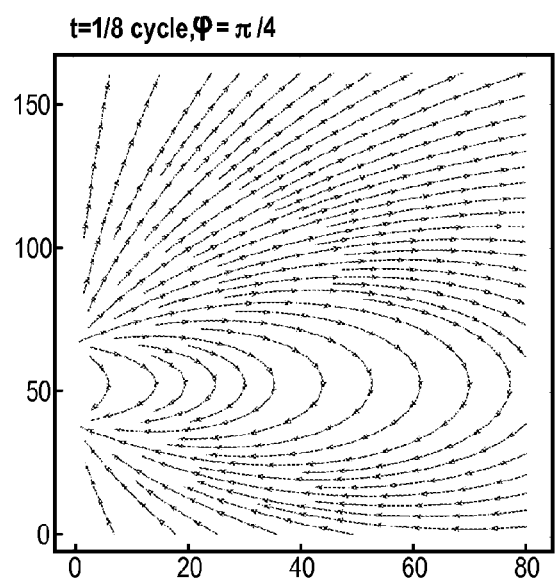
Figure 23D:
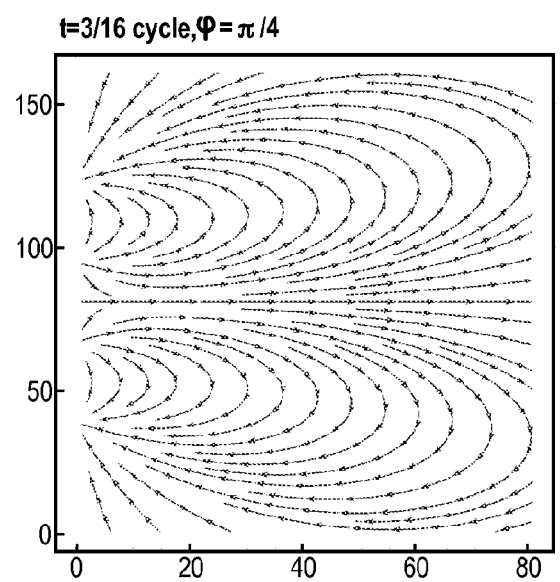
Figure 23E:
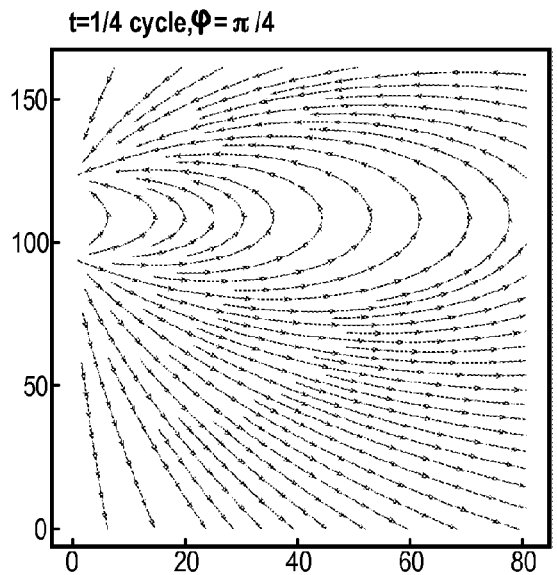
Figure 23F:
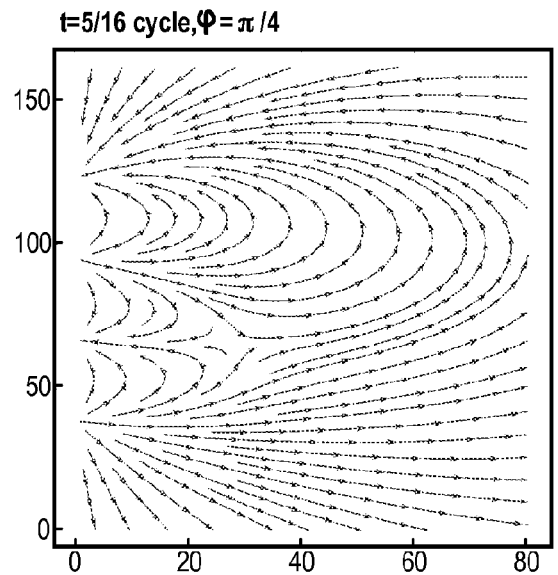
Figure 23G:
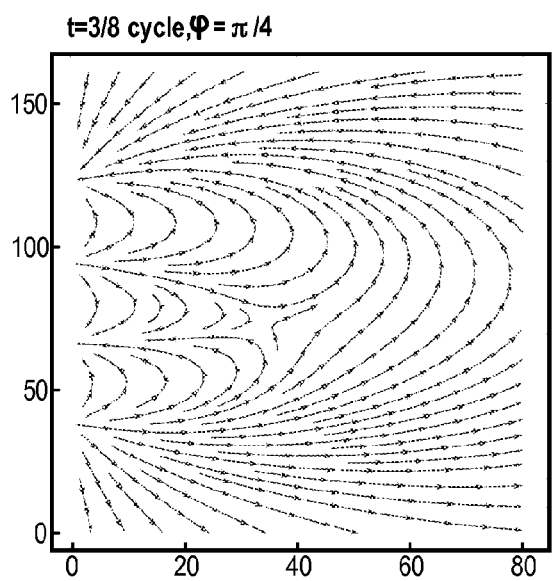
Figure 23H:
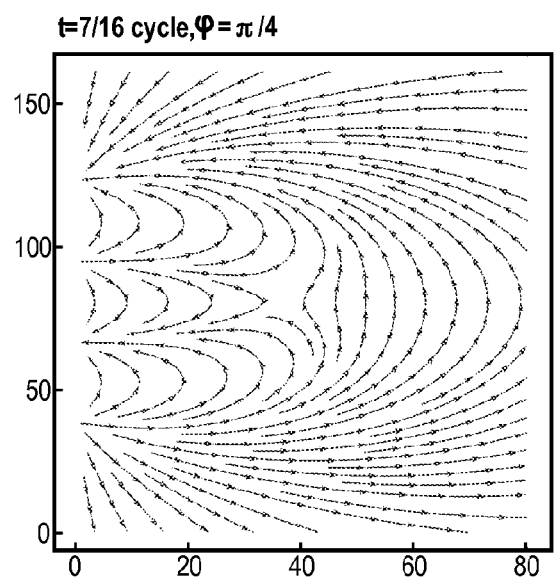
Figure 23I:
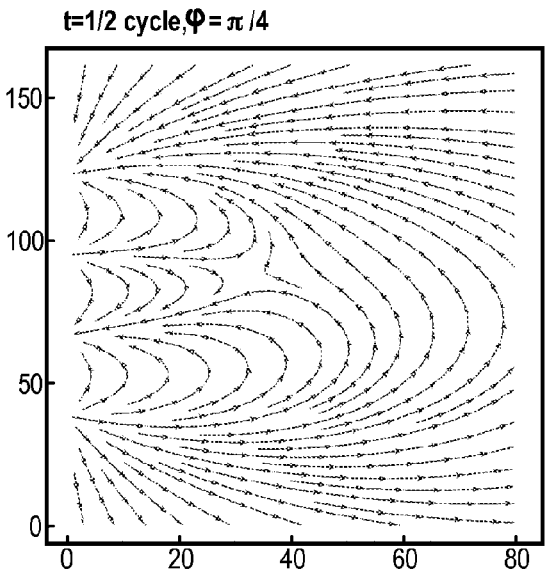
Figure 23J:
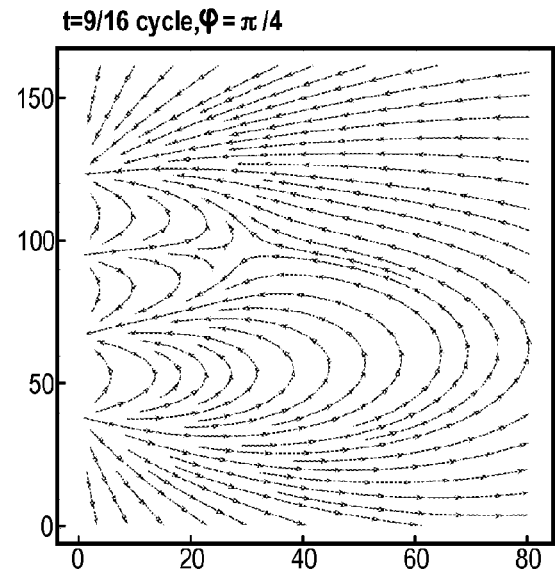
Figure 23K:
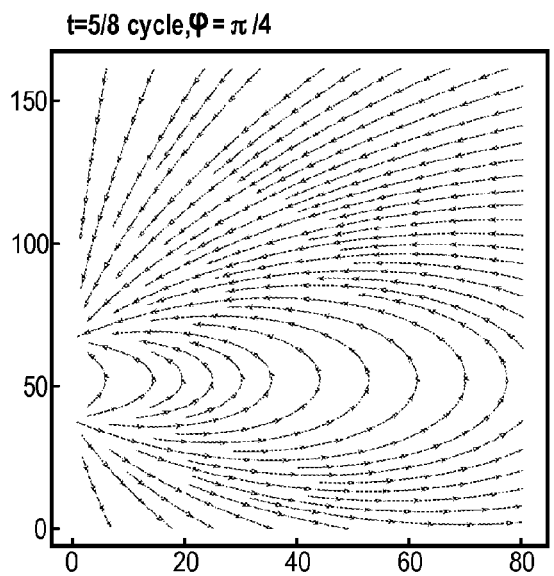
Figure 23L:
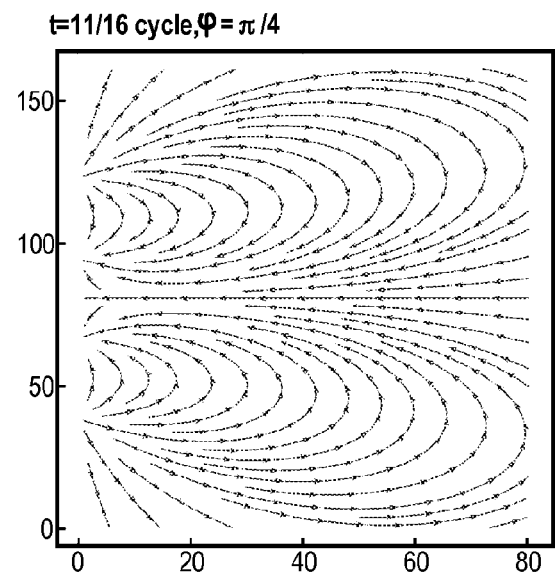
Figure 23M:
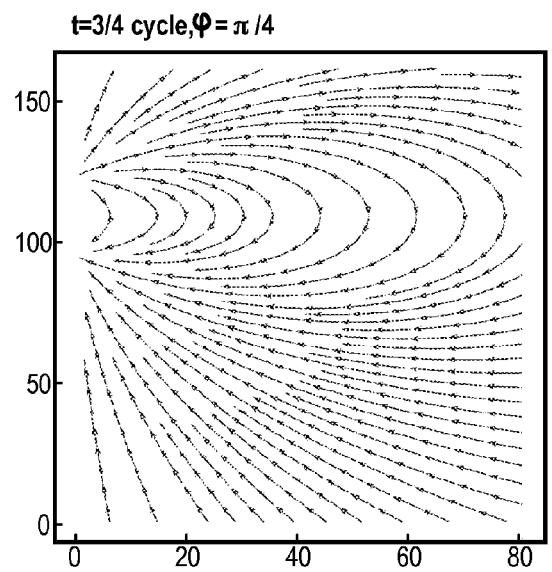
Figure 23N:
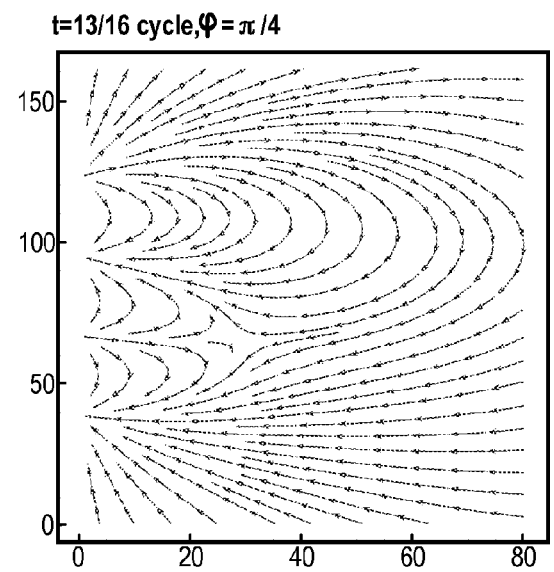
Figure 23O:
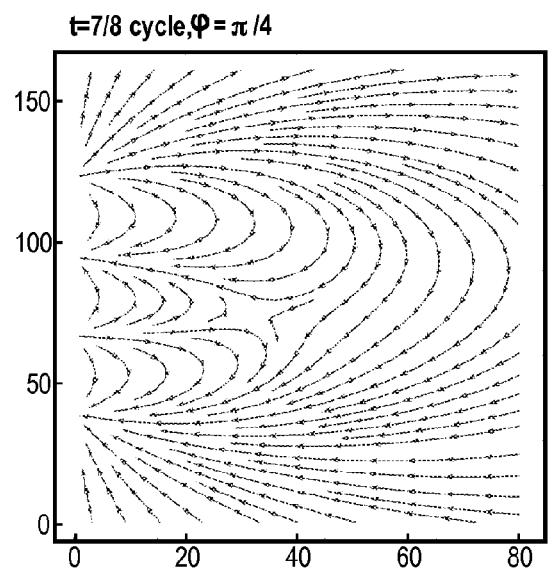
Figure 23P:
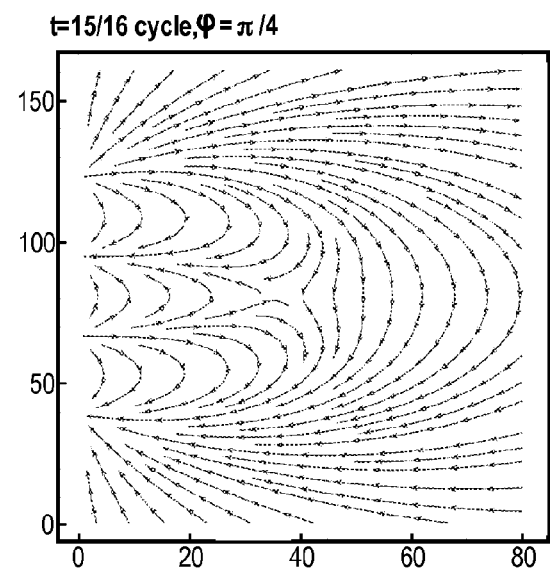

For example, consider two resonant structures 2100 and 2110 separated by 7 meters, and the phase of the upper resonant structure 2100 is swept at a constant rate from 0 degrees to 360 degrees. Assuming that the effects of formation resistivity are negligible, vector stream plots are calculated using the following pair of functions as a function of phase (FIG. 22A-P) and time (FIG. 23A-P):

$$\begin{cases} \cos[2\pi f t] H_\rho[\rho, z, L, L_L] + \cos[2\pi f t + \varphi] H_\rho[\rho, z, L, L_U] \\ \cos[2\pi f t] H_z[\rho, z, L, L_L] + \cos[2\pi f t + \varphi] H_z[\rho, L, L_U] \end{cases},$$

where f is the frequency in Hz, $H_\rho[\rho,z,L,L_L]$ is the radial field component from a solenoid of length L symmetrically situated around the z-axis with its lowest z-coordinate at $L_L$ (lower solenoid 2110), $H_\rho[\rho, z, L, L_u]$ is the radial field component from a solenoid of length L symmetrically situated around the z-axis with its lowest z-coordinate at $L_U$ (upper solenoid 2100, where the phase of solenoid 2100 is varied with respect to the phase of the lower solenoid 2110), $H_z[\rho, z, L, L_L]$ is the z-field component from solenoid of length L symmetrically situated around the z-axis with its lowest z-coordinate at $L_L$ (lower solenoid 2110), $H_z[\rho,z,L,L_u]$ is the z-field component from a solenoid of length L symmetrically situated around the z-axis with its lowest z-coordinate at $L_u$ (upper solenoid 2100, where the phase of solenoid 2100 is varied with respect to the phase of the lower solenoid 2110), t is the time in seconds, and φ is the phase in radian measure.

Focused lobes of increased magnetic field strength may be directionally projected by varying the phase of one resonant structure relative to another. For example, as illustrated in FIG. 22, where the vertical axes represent distance along the casing (from −20 meters to 20 meters) and the horizontal axes represent distance away from the casing (from 0.25 meters to 20 meters), different lobe patterns may be generated by varying the phase of one resonant structure relative to another resonant structure. These lobes may also vary in time. For example, as illustrated in FIG. 23, where the vertical axes represent distance along the casing (from −20 meters to 20 meters) and the horizontal axes represent distance away from the casing (from 0.25 meters to 20 meters), different lobe patterns may emerge over time, given one resonant structure with a phase difference of π/4 radians compared to that of another resonant structure. Thus, one or more resonant structures 2100 may be arranged along pipe casing 2120, and the phase of each may be adjusted in this manner to achieve the desired magnetic field characteristics across a broad region around well casing 2120.

In some embodiments, it is possible to communicate with resonant structures 2100 at a low data rate by modulating the signal applied from a current source. This allows the phase of each resonant structure 2100 to set the phase of each resonant structure relative to that of its neighboring units, and thus set the field pattern to be peaked in a particular direction. This can be used when the approximate location of the approaching well relative to the existing wells is known, and may thus provide a stronger and less ambiguous signal to the sensors used for ranging within that well.

In some embodiments, a small amount of data can be additionally transferred from a given resonant structure to a well under construction by slowly modulating its phase. In some implementations, this is used to identify the well being approached and the depth of a well structure from the well head. In these embodiments, a resonator with active electronics is maintained in a power conserving mode until a signal is detected from a ranging tool. Once this is detected, the resonant structure goes into an active amplification mode.

Using two or more resonators, it is possible to modulate the ellipticity of the magnetic field in a region of space by modifying the phase, as described above. If this is done dynamically at a rate significantly slower than the resonant frequency, additional information can be provided to the ranging tool as to which well is responding and what portion of the well is responding.

In some embodiments, resonators are activated simultaneously by current source 2130, but they do not have the same resonant frequency. Small, but detectable differences in frequency are designed into the system, such that activating resonators results in beat frequencies in the stabilized field. This can be used to provide additional information to the ranging tool.

While a number of embodiments for detecting a well casing have been described, the embodiments are not limited to detecting and locating well casings, and may be used to detect any conductive well structure. For instance, embodiments may be used to detect and locate liners, screens, lost in hole drill strings, or any other downhole conductive structures upon which a resonant structure can be mounted. For instance, in some embodiments, beacons with resonant structures may be placed within a liner or within a screen, and a ranging tool can be used to detect and locate the liner and screens.

A number of embodiments of the invention have been described. Nevertheless, it will be understood that other implementations are possible. For example, while one or more inductors of resonant structure 132 are described as being wound around well casing 110, other embodiments are considered. In some embodiments, one or more inductors of resonant structure 132 are wound around another structure, and this structure is attached to well casing 110. In other embodiments, this structure is instead placed in proximity to well casing 110 without direct contact. In other embodiments, one or more inductors of resonant structure 132 are wound around the inside of well casing 110. In still other embodiments, one or more inductors of resonant structure 132 are placed within well casing 110 itself, such that they are integrated within the walls of the well casing.

Some embodiments may be used in conjunction with steam assisted gravity drainage (SAGD) techniques. During SAGD operations, two or more substantially horizontal wells are drilled into an oil reservoir, and a high pressure steam is continuously injected into the upper wellbore. This steam heats the oil of the reservoir and reduces its viscosity. The less viscous oil drains into the lower well, where it is pumped to the surface. Embodiments may be used to detect and locate well structures during SAGD operations, for instance during well construction. As an example, during construction two or more well are constructed in close relative proximity such that one well structure runs approximately parallel to another. Embodiments may be used to detect and locate existing well structures in order to accurately direct a drill unit, and to ensure the proper placement of well structures.

Embodiments may be used in conjunction with various aspects of SAGD techniques, for instance during the construction and operation of the two wells. In some embodiments, the position of each well may be tracked Accordingly, other embodiments are within the scope of the following claims.

What is claimed is:

1. A system for detecting a well structure comprising:
   an electrically conductive first well structure; and
   a resonant structure attached to the first well structure, the resonant structure having a resonant frequency, and the resonant structure comprising an electromagnetically resonant structure,
   the resonant structure being provided to generate a time varying magnetic response field having a frequency at or near the resonant frequency upon either:
      inducement of a time varying magnetic inducing field at or near the resonant frequency in proximity of the first well structure, the time varying magnetic inducing field provided by a ranging device in a second well structure, or inducement of a current in the first well structure at or near the resonant frequency, the current created by the time varying magnetic inducing field.

2. The system of claim 1, wherein the resonant frequency is between 1 Hz and 1000 Hz.

3. The system of claim 1, wherein the resonant structure further comprises a gyrator circuit.

4. The system of claim 1, wherein the electrically conductive first well structure is a solenoid or a toroidal inductor.

5. The system of claim 4, wherein the electrically conductive first well structure comprises two or more individual conductive elements operably connected together around the first well structure.

6. The system of claim 1, wherein the resonant structure is a first resonant structure and further including one or more additional resonant structures.

7. The system of claim 6, wherein the additional resonant structures have resonant frequencies at or near the resonant frequency of the first resonant structure.

8. The system of claim 6, wherein the additional resonant structures have resonant frequencies different from the resonant frequency of the first resonant structure.

9. The system of claim 6, wherein the first and additional resonant structures are located at different positions of the first well structure.

10. The system of claim 6 wherein the first and additional resonant structures are located on a plurality of well casings.

11. The system of claim 10, wherein the plurality of well casings is located in a plurality of wells.

12. The system of claim 6, wherein the response field generated by the first resonant structure is out of phase with a time varying magnetic response field generated by the additional resonant structures.

13. The system of claim 12, wherein a phase difference between the response field generated by the first resonant structure and the response field generated by the additional resonant structures is adjustable.

14. The system of claim 1, wherein the first well structure is a well casing and the electrically conductive well structure is wound around an outer surface of the well casing.

15. The system of claim 1, wherein the first well structure is a well casing and the electrically conductive well structure is wound around an inner surface of the well casing.

16. The system of claim 1, wherein the first well structure is a well casing and the electrically conductive well structure is wound in a region between an outer and an inner surface of the well casing.

17. The system of claim 1, wherein the resonant structure has a passive circuit configuration.

18. The system of claim 1, wherein the resonant structure has an actively powered configuration.

19. The system of 1, wherein upon detection of a signal, the resonant structure changes from a low power state to a high power state.

20. The system of claim 1, wherein the ranging device is located in a borehole or in a well casing of the second well.

21. The system of claim 1, wherein the ranging device is located on a measurement-while-drilling (MWD) tool or on a wireline tool.

22. The system of claim 21, wherein the ranging device located on the MWD tool is in proximity to a drill unit.

23. A system for detecting a well structure comprising:
an electrically conductive first well structure;
a resonant structure located on the first well structure and having at least one resonant frequency; and
a ranging device in a second well structure;
  the resonant structure being provided to produce a time varying magnetic response field upon either:
    inducement of a time varying magnetic inducing field in proximity of the first well structure the time varying magnetic inducing field provided by the ranging device, or
    inducement of a current in the first well structure, the current created by the time varying magnetic inducing field;
  the ranging device being provided to induce the inducing field, to obtain a measurement of the response field, and to determine at least one location parameter between the ranging device and the resonant structure based upon the measurement of the response field; and
  wherein the frequencies of the response field, inducing field, and current in the first well structure are at or near the resonant frequency of the resonant structure; and
  wherein the ranging device is further provided to induce a time varying magnetic inducing field with a swept range of frequencies.

24. A system for detecting a well structure comprising:
an electrically conductive first well structure;
a resonant structure located on the first well structure and having at least one resonant frequency; and
a ranging device in a second well structure;
  the resonant structure being provided to produce a time varying magnetic response field upon either:
    inducement of a time varying magnetic inducing field in proximity of the first well structure, the time varying magnetic inducing field provided by a ranging device in a second well structure, or
    inducement of a current in the first well structure, the current created by the time varying magnetic inducing field;
  the ranging device being provided to induce the inducing field, to obtain a measurement of the response field, and to determine at least one location parameter between the ranging device and the resonant structure based upon the measurement of the response field; and
  wherein the frequencies of the response field, inducing field, and current in the first well structure are at or near the resonant frequency of the resonant structure; and
  wherein the ranging device is further provided to have a selectable frequency of the inducing field.

25. A method for detecting a well casing comprising:
providing a resonant structure on the well casing, the resonant structure having a resonant frequency;
producing a time varying magnetic response field from the resonant structure by either inducing a time varying magnetic inducing field by a ranging device in a well structure at or near the resonant frequency in proximity of the well casing or by inducing a current by the inducing field at or near the resonant frequency in the well casing;
determining a measurement of the time varying magnetic response field produced by the inducing field or by the current in the well casing; and
determining a location of the well casing based upon the measurement.

26. The method of claim 25, wherein the resonant frequency is between 1 Hz and 1000 Hz.

27. The method of claim 25, further comprising providing a current source to produce the current in the well casing.

28. The method of claim 25, wherein providing a resonant structure comprises providing a first resonant structure and one or more additional resonant structures.

29. The method of claim 28, wherein the response field generated by the first resonant structure is out of phase with a time varying magnetic response field generated by the additional resonant structures.

30. The method of claim 29, wherein a phase difference between the response field generated by the first resonant structure and the response field generated by the additional resonant structures is adjustable.

* * * * *